(12) United States Patent
Magarill et al.

(10) Patent No.: US 7,222,968 B2
(45) Date of Patent: May 29, 2007

(54) ILLUMINATION SYSTEM WITH SEPARATE OPTICAL PATHS FOR DIFFERENT COLOR CHANNELS

(75) Inventors: Simon Magarill, Cincinnati, OH (US); Todd S. Rutherford, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 173 days.

(21) Appl. No.: 10/845,677

(22) Filed: May 14, 2004

(65) Prior Publication Data

US 2005/0254018 A1 Nov. 17, 2005

(51) Int. Cl.
*G03B 21/00* (2006.01)
*G03B 21/14* (2006.01)
*G03B 21/20* (2006.01)
*G03B 21/26* (2006.01)
*G03B 21/28* (2006.01)

(52) U.S. Cl. .............................. 353/31; 353/33; 353/37; 353/94; 353/97; 353/102

(58) Field of Classification Search ................ 353/31, 353/37, 94, 102, 33, 97, 99; 359/15, 619; 362/244, 268, 19, 331, 555, 558
See application file for complete search history.

(56) References Cited

U.S. PATENT DOCUMENTS

| | | | |
|---|---|---|---|
| 5,231,432 A | 7/1993 | Glenn | 353/31 |
| 5,442,414 A | 8/1995 | Janssen | 353/98 |
| 5,552,922 A | 9/1996 | Magarill | 359/224 |
| 5,625,738 A | 4/1997 | Magarill | 385/146 |
| 5,719,706 A | 2/1998 | Masumoto | 359/622 |
| 6,040,881 A | 3/2000 | Koyama | 349/9 |
| 6,224,216 B1 | 5/2001 | Parker | 353/31 |
| 6,227,669 B1 | 5/2001 | Tiao | 353/31 |
| 6,318,863 B1 | 11/2001 | Tiao | 353/31 |
| 6,341,867 B1 * | 1/2002 | Itoh | 353/20 |
| 6,341,876 B1 | 1/2002 | Moss | 362/268 |
| 6,402,347 B1 | 6/2002 | Maas | 362/294 |
| 6,453,067 B1 | 9/2002 | Morgan | 382/162 |
| 6,486,997 B1 | 11/2002 | Bruzzone | 359/247 |
| 6,545,814 B2 | 4/2003 | Bartlett | 359/636 |
| 6,547,400 B1 | 4/2003 | Yokoyama | 353/99 |
| 6,698,893 B2 * | 3/2004 | Takimoto et al. | 353/31 |
| 6,834,963 B2 * | 12/2004 | Kim et al. | 353/31 |
| 2001/0022613 A1 | 9/2001 | Matsui | 348/75 |
| 2001/0036083 A1 | 11/2001 | Weber | 362/555 |
| 2001/0048493 A1 | 12/2001 | Swanson | 349/62 |
| 2001/0048560 A1 | 12/2001 | Sugano | 359/618 |

(Continued)

FOREIGN PATENT DOCUMENTS

EP 0 985 952 3/2000

(Continued)

*Primary Examiner*—Melissa Jan Koval

(57) ABSTRACT

Illumination systems are disclosed, which include illumination channels of different colors and at least one image-forming device. Each illumination channel, in turn, includes a bank of light sources, and the image-forming device is disposed to receive illumination from at least one of the illumination channels. At least one of the illumination channels includes an optical element, such as an optical element having optical power or a homogenizing optical element, that is not shared with any other illumination channel and is preferentially constructed or preferentially positioned for the color of its illumination channel.

46 Claims, 13 Drawing Sheets

U.S. PATENT DOCUMENTS

| | | | |
|---|---|---|---|
| 2002/0180937 A1 | 12/2002 | DeVaan | 353/33 |
| 2003/0011559 A1 | 1/2003 | Adachi | 345/102 |
| 2003/0038923 A1 | 2/2003 | Aastuen | 353/31 |
| 2003/0133080 A1 | 7/2003 | Ogawa | 359/47 |
| 2003/0193649 A1 | 10/2003 | Seki | 353/20 |
| 2003/0214815 A1 | 11/2003 | Ishida | 362/516 |
| 2004/0042212 A1 | 3/2004 | Du | 362/296 |

FOREIGN PATENT DOCUMENTS

| | | |
|---|---|---|
| EP | 1418765 | 5/2004 |
| WO | WO 01/43113 | 6/2001 |
| WO | WO 03/056876 | 7/2003 |

* cited by examiner

— Idealized step filter
— Realistic filter (6 deg. cone angle)
— Realistic filter (12 deg. cone angle)

ILLUMINATION SYSTEM WITH SEPARATE OPTICAL PATHS FOR DIFFERENT COLOR CHANNELS

FIELD OF THE INVENTION

The present disclosure relates to illumination systems that may find application, for example, in projection systems. More specifically, the present disclosure relates to illumination systems having at least partially separate optical paths for different color channels.

BACKGROUND

Typical projection systems usually include a source of light, illumination optics, one or more image-forming devices, projection optics and a projection screen. The illumination optics collect light from one or more light sources and direct that light in a predetermined manner to one or more image-forming devices. The image-forming devices, controlled by an electronically conditioned and processed digital video signal or by other input data, produce images corresponding to the video signal or to that data. Projection optics then magnify the image and project it onto the projection screen. White light sources, such as arc lamps, in conjunction with color-maintaining systems, have been and still are predominantly used as light sources for projection display systems. However, recently, light emitting diodes (LEDs) were introduced as an alternative. Some advantages of LED light sources include longer lifetime, higher efficiency and superior thermal characteristics.

One example of an image-forming device frequently used in projection systems is a digital micro-mirror device, or digital light processing device (DLP). The main feature of a DLP is an array of tiltable micro-mirrors. The tilt of each mirror is independently controlled by the data loaded into a memory cell associated with each mirror, so that the mirrors steer reflected light and spatially map a pixel of video data onto a pixel on a projection screen. Light reflected by a mirror in an ON state passes through the projection optics and is projected onto the screen to create a bright field. On the other hand, light reflected by a mirror in an OFF state misses the projection optics, which results in a dark field. A color image may be produced with a single DLP by color sequencing, or, alternatively, with three DLPs, each illuminated with a primary color.

Other examples of image-forming devices include liquid crystal panels, such as a liquid crystal on silicon device (LCoS). In liquid crystal panels, the alignment of the liquid crystal material is controlled incrementally (pixel-to-pixel), as determined by the data corresponding to a video signal. Depending on the alignment of the liquid crystal material, polarization of the incident light may be altered by the liquid crystal structure. Thus, with the appropriate use of polarizers or polarizing beam splitters, dark and light regions corresponding to the input video data may be created. Color images are formed using liquid crystal panels in a manner similar to DLPs, by using a sequential color approach with one LCoS device or by using a separate LCoS device for each primary color.

Another type of an image-forming device is a high temperature polysilicon liquid crystal device (HTPS-LCD). HTPS-LCD also includes a liquid crystal layer, in which the alignment can be controlled incrementally (pixel-to-pixel), as determined by the data corresponding to a video signal. The liquid crystal layer is sandwiched between a glass substrate and an array of transparent electrodes, thus being adapted for operation in transmission. At the corner of each HTPS-LCD pixel, there is a microscopic thin film transistor.

SUMMARY

The present disclosure is directed to illumination systems including illumination channels of different colors. Each illumination channel includes a bank of light sources having at least one optical element having optical power. Such illumination systems also include an image-forming device disposed to receive illumination from at least one of the illumination channels. At least one of the optical elements of at least one of these illumination channels is not shared with other illumination channels and that optical element is preferentially constructed or preferentially positioned for the color of its illumination channel.

In addition, the present disclosure is directed to illumination systems including illumination channels of different colors, each illumination channel, in turn, including a bank of light sources. Such illumination systems have at least one optical element, which can be an optical element having optical power or a homogenizing optical element, disposed in one of the illumination channels, said optical element not shared with other illumination channels and preferentially constructed or preferentially positioned for the color of its illumination channel. These illumination systems further include an image-forming device disposed to receive illumination from at least one of the illumination channels.

The present disclosure is also directed to illumination systems, which include an illumination channel of a first color and an illumination channel of a second color. The first color illumination channel includes a first bank of light sources optically connected to a first image-forming device, while the second color illumination channel includes a second bank of light sources optically connected to a second image-forming device. Such illumination systems also include an optical element, such as an optical element having optical power or a homogenizing optical element, disposed in one of the illumination channels, the optical element not being shared with any other illumination channel and preferentially constructed or preferentially positioned for the color of its illumination channel.

In addition, the present disclosure is directed to illumination systems including an illumination channel of a first color including a first bank of light sources, an illumination channel of a second color including a second bank of light sources, an image-forming device optically connected to the first and second banks of light sources, and a system of optical elements. The system of optical elements includes an integrator, a dichroic mirror disposed between the first bank of light sources and the integrator for combining illumination of the first and second illumination channels. In such illumination systems, at least one of the light source banks comprises a plurality of light sources and a plurality of optical elements, the light sources and the optical elements configured to form a plurality of aimed-in channels.

These and other aspects of the illumination systems of the subject invention will become readily apparent to those of ordinary skill in the art from the following detailed description together with the drawings.

BRIEF DESCRIPTION OF THE DRAWINGS

So that those of ordinary skill in the art to which the subject invention pertains will more readily understand how to make and use the subject invention, exemplary embodiments thereof will be described in detail below with reference to the drawings, wherein.

DETAILED DESCRIPTION

Figure 1:
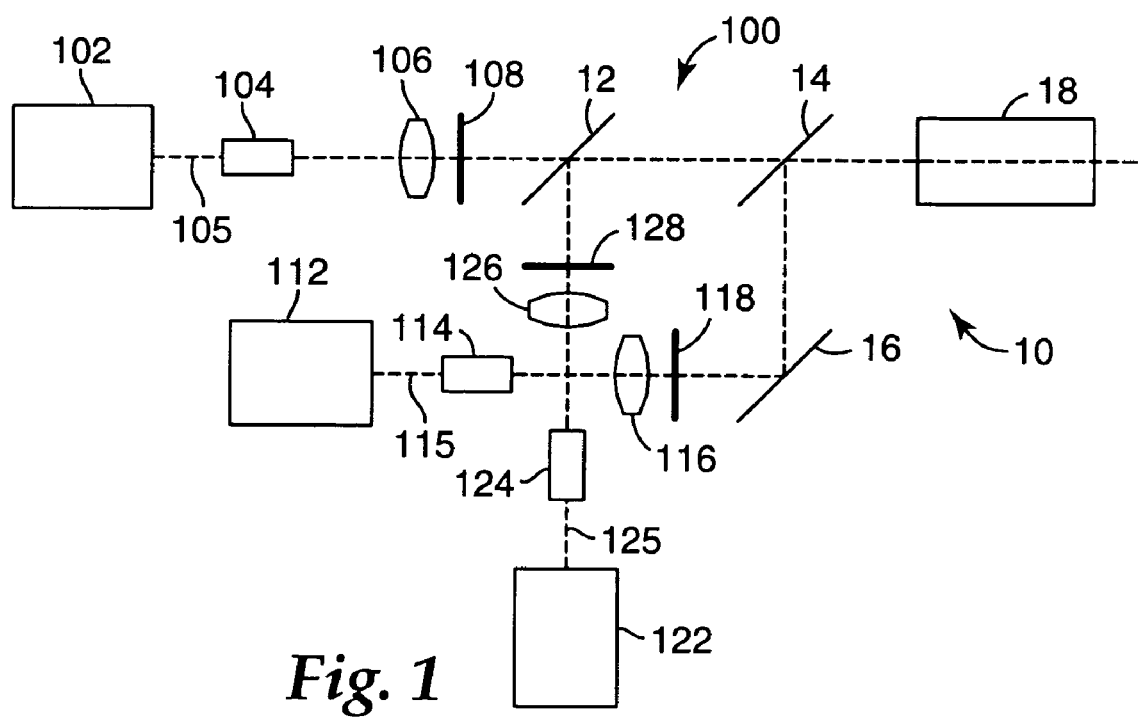
FIG. 1 shows schematically a portion of a 3-panel projection system incorporating an exemplary illumination system constructed according to the present disclosure.

Exemplary embodiments of the present disclosure can provide illumination for microdisplay projectors in such a way that illumination channels for different colors are physically separated for at least a portion of the optical path extending from a light source or a group of light sources to an illumination target. For example, FIG. 1 shows schematically a portion of a 3-panel projection system 10 incorporating an exemplary illumination system 100 constructed according to the present disclosure, in which at least a portion of the optical path for each color channel (here, red, green and blue) is not shared with other color channels. In particular, the exemplary illumination system 100 includes channels corresponding to different primary colors, illustrated in FIG. 1 as a red color channel 105, a green color channel 115 and a blue color channel 125. Illumination systems utilizing light sources and channels of other colors, as suitable for a particular application, are also within the scope of the present disclosure.

The red color channel 105 includes a bank of red light sources 102, such as red LEDs, a homogenizing optical element, such as an integrator 104, a relay optic 106, such as one or more lenses or other optical elements having optical power, and an image-forming device 108. The exemplary projection system 10 illustrated in FIG. 1 includes transmissive image forming devices, such as high temperature HTPS-LCDs, but other exemplary embodiments of the present disclosure can include reflective image-forming devices, such as LCoS devices or DLPs. The green color channel 115 includes a bank of green light sources 112, such as green LEDs, a homogenizing optical element, such as an integrator 114, a relay optic 116, such as one or more lenses or other optical elements having optical power, and an image-forming device 118. The blue color channel 125, in turn, includes a bank of blue light sources 122, such as blue LEDs, a homogenizing optical element, such as an integrator 124, a relay optic 126, such as one or more lenses or other optical elements having optical power, and an image-forming device 128.

Integrators suitable for use with the appropriate exemplary embodiments of the present disclosure are described, for example, in U.S. Pat. Nos. 5,625,738 and 6,332,688, the disclosures of which are hereby incorporated by reference herein to the extent they are not inconsistent with the present disclosure. The integrators serve to homogenize the outputs of the banks of light sources, such as 102, 112 and 122. Examples of integrators suitable for use with the embodiments of the present disclosure include mirror tunnels, e.g., rectangular tunnels, solid or hollow, or elongated tunnels composed of solid glass rods that rely on total internal reflection to transfer light. Those of ordinary skill in the art will appreciate that numerous shapes and numerous shape combinations of the entrance and exit ends of the integrators are within the scope of the present disclosure. However, where the illumination target, such as an image-forming device has a rectangular shape, it is particularly advantageous to use an integrator having a rectangular exit end that has the same aspect ratio as the illumination target. In some embodiments of the present disclosure, relay optics 106, 116 and 126 are configured to image the exit ends of the integrators 104, 114 and 124 onto the image-forming devices 108, 118 and 128, respectively.

Referring further to FIG. 1, light transmitted through and modulated by the red and blue image-forming devices may be combined using a dichroic combiner 12, which may be or may include one or more dichroic mirrors. In this exemplary embodiment, the dichroic combiner includes a dichroic mirror 12, constructed so that it transmits in the red portion of the visible spectrum, while exhibiting relatively high reflectivity in the blue portion of the visible spectrum. Light transmitted through and modulated by the green image-forming device may be added to the combined red and blue beam using a mirror 16 and another dichroic mirror 14. The dichroic mirror 14, in this exemplary embodiment, is constructed so that it transmits in the red and blue portions of the visible spectrum, while exhibiting relatively high reflectivity in the green portion of the spectrum. The combined modulated red, green and blue beams are then collected by the projection optics 18, which may include one or more lenses, for delivery to a screen (not shown) or to another optical element, system or device for further processing.

Figure 2A:
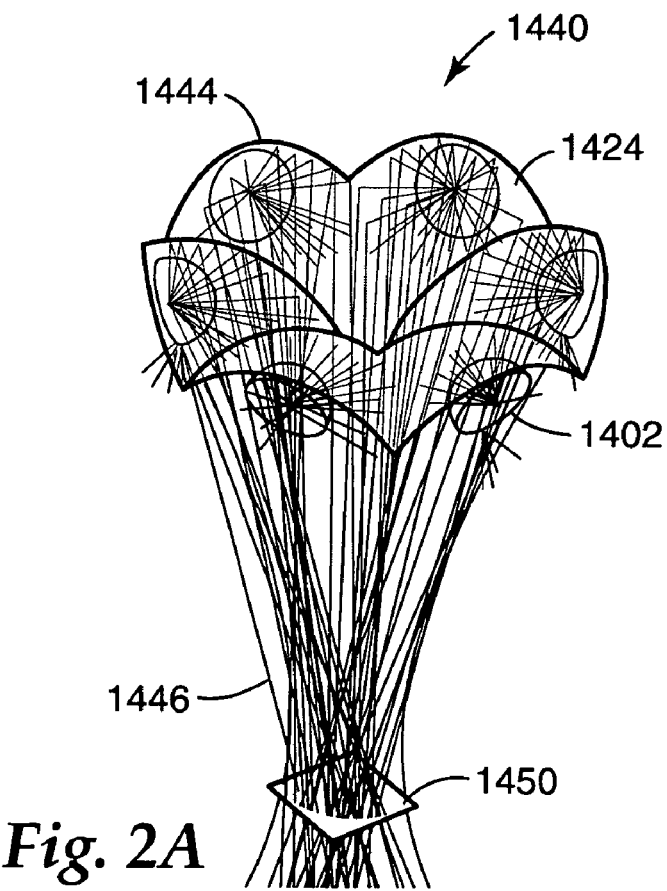
FIG. 2A shows schematically an exemplary bank of light sources suitable for use in some illumination systems constructed according to the present disclosure, which includes a reflector body formed from six shaped reflector portions.
Figure 2B:
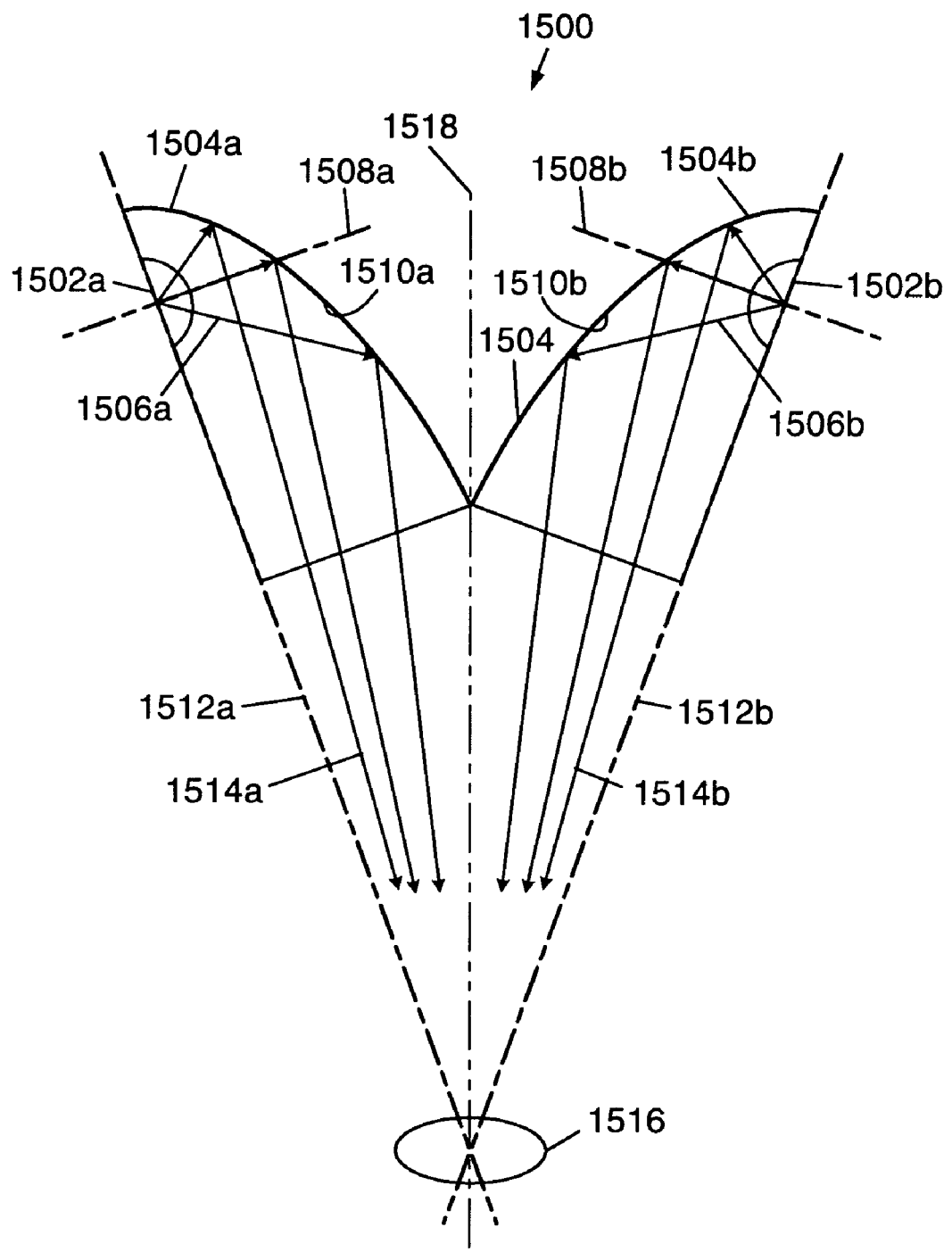
FIG. 2B shows schematically a cross-section through a bank of light sources configured as shown in FIG. 2A.
Figure 2C:
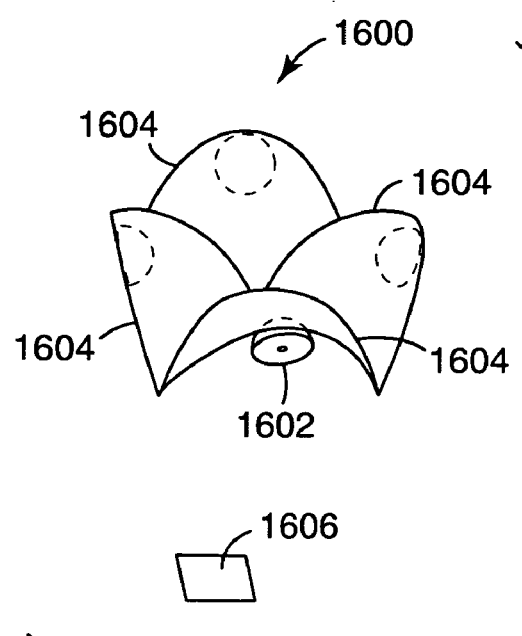
FIG. 2C shows schematically an exemplary bank of light sources suitable for use in some illumination systems constructed according to the present disclosure, which includes a reflector body formed from four shaped reflector portions.

As mentioned above, exemplary light sources suitable for use in the illumination systems constructed according to the present disclosure include LEDs. Although LEDs with higher output power are becoming more available, most microdisplay projection illumination applications require large numbers of LEDs in order to achieve sufficiently high intensity of illumination at the target plane, such as a screen. A typical currently available single LED usually is not bright enough to illuminate a typical projection system. Thus, it is important that arrangements of large numbers of LEDs be configured and packaged effectively, so that light from the LED assemblies would be collected in an efficient manner within a given etendue, and then directed to a specific illumination target area within a given solid angle.

Where the banks of light sources 102, 112 and 122 include LEDs or similar light sources, such light sources can be disposed in a variety of configurations, including arrays, clusters, and other suitable geometrical arrangements. In the appropriate embodiments of the present disclosure, such banks of light sources are arranged in certain geometrical relationships with respect to the integrators, such as the integrators 104, 114 and 124. FIGS. 2A–4 illustrate schematically various suitable structures and arrangements of the banks of light sources that allow efficient collection of light. For example, FIGS. 2A, 2B and 2C show LEDs or similar light sources incorporated into assemblies of shaped side reflectors having optical power. Exemplary shaped side reflectors are described in the commonly assigned U.S. application Ser. No. 10/701,201, entitled "Side Reflector for Illumination Using Light Emitting Diode," filed on Nov. 4, 2003, the disclosure of which is hereby incorporated by reference herein to the extent it is not inconsistent with the present disclosure.

FIG. 2A shows schematically an exemplary bank of light sources 1440, having a shaped reflector body 1444 formed from six shaped reflector portions 1424. The shaped reflector portions may be hollow or solid and they may have reflective surfaces that conform to at least a portion of, for example, an ellipsoidal, paraboloidal, or another type of surface of revolution. Light sources 1402 are arranged with respect to the shaped reflector portions 1424, so that light emitted by a light source 1402 is reflected by a respective shaped reflector portion 1424 and directed to an illumination target 1450, as illustrated by rays 1446.

FIG. 2B schematically presents a cross-section through a bank of light sources configured as shown in FIG. 2A. The bank of light sources 1500 has a shaped reflector body 1504 including shaped reflector portions 1504a and 1504b and light sources 1502a and 1502b. Each shaped reflector portion 1504a and 1504b is formed with a reflective surface 1510a or 1510b that conforms to a surface of revolution about its respective revolution axis 1512a or 1512b. The light sources 1502a and 1502b emit light rays 1506a and 1506b toward the shaped reflector portions 1504a and 1504b, which are reflected as light rays 1514a and 1514b. The axes 1508a and 1508b of the light sources are typically non-parallel to the respective revolution axes 1512a and 1512b and are located so that the light rays 1514a and 1514b are directed to the illumination target 1516. The shaped reflectors 1504a and 1504b may be symmetrically placed about an axis 1518. The axes 1512a and 1512b may or may not intersect with the body axis 1518 at the same intersection point and may or may not form the same angle to the body axis 1518.

The light source banks having a shaped reflector body may include different numbers of shaped reflector portions and different numbers of light sources. For example, FIG. 2C shows a bank of light sources 1600 that has a shaped reflector body formed from four shaped reflector portions 1604 and four light sources 1602 arranged with respect to the shaped reflector portions 1604 to supply light to the illumination target 1606. In the appropriate embodiments of the present disclosure, the illumination targets 1450, 1516 and 1606 may be entrance ends of integrators, for example, integrators 104, 114 and 124.

Figure 3:
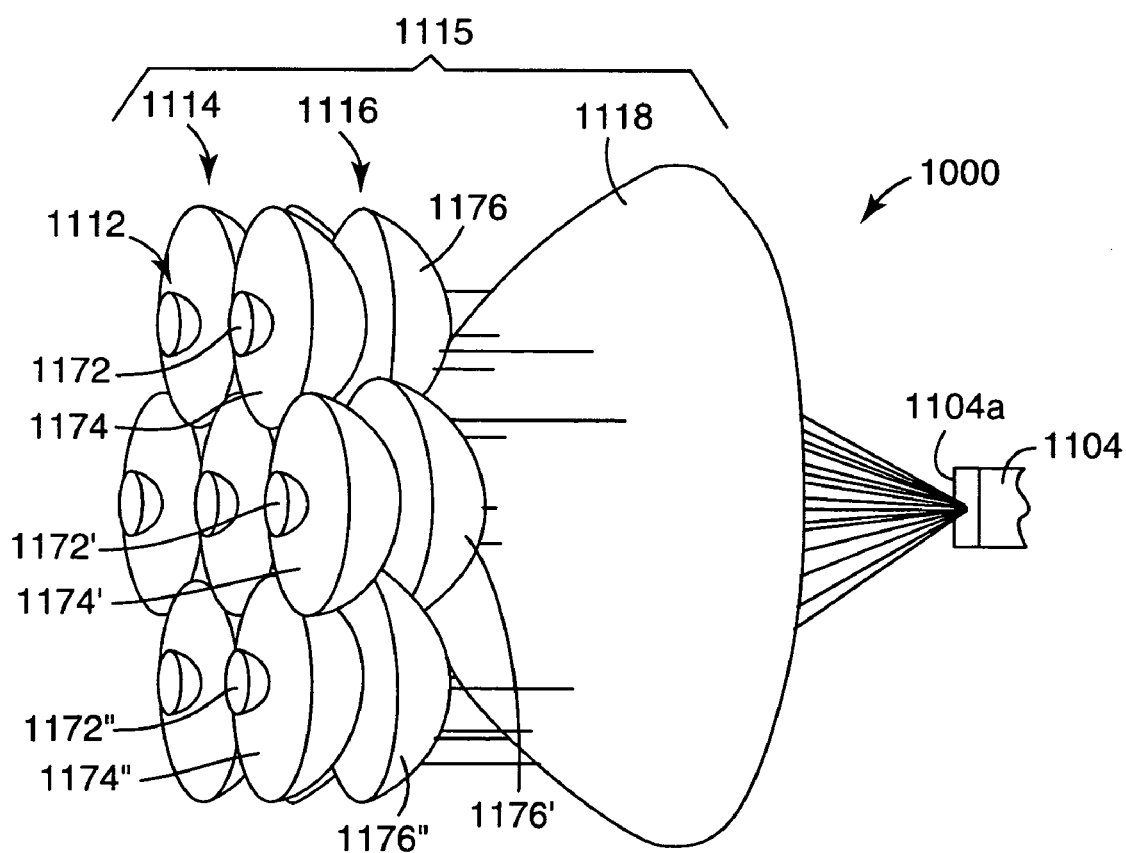
FIG. 3 shows schematically a perspective view of another exemplary bank of light sources suitable for use in some illumination systems constructed according to the present disclosure, in which LEDs or similar light sources are used in combination with refractive arrays and condensers.

FIG. 3 shows schematically another exemplary bank of light sources 1000, in which LEDs or similar light sources are used in combination with arrays of refractive elements and condensers. Examples of such banks of light sources are described in the commonly owned U.S. application Ser. No. 10/776,152 entitled "Illumination System," filed on Feb. 11, 2004, and in the commonly owned U.S. application Ser. No. 10/776,390, entitled "Light-Collecting Illumination System," filed on Feb. 11, 2004. The disclosures of both applications are hereby incorporated by reference herein to the extent they are not inconsistent with the present disclosure.

The bank of light sources 1000 shown in FIG. 3 includes a set of light sources 1112, illustrated by the light sources 1172, 1172', 1172", such as LEDs or similar light sources, and a system of optical elements 1115. The system of optical elements 115 includes a first set of lenses 1114, including lenslets 1174, 1174', 1174", a second set of lenses 1116, including lenslets 1176, 1176', 1176", and a condenser 1118, such as a plano-convex lens or another type of lens or lenses. A pair of lenslets (one from the set 1114 and one from the set 1116, which can be meniscus lenses or other optical elements having optical power) may be associated with each light source from the set 1112. Many configurations of the sets of light sources 1112, types of the individual light sources, numbers and types of lenslets or other optical elements having optical power in the sets 1114 and 1116, and the number of sets, are within the scope of the present disclosure, depending on the application, desired system configuration, dimensions of the system, and the system's output brightness. For example, the sets of lenses 1114 and 1116 can be configured as a double-layered closely packed array or it may have another suitable configuration, with the configuration of the set of light sources 1112 preferably substantially tracking the configuration of the sets of lenses.

Figure 4:
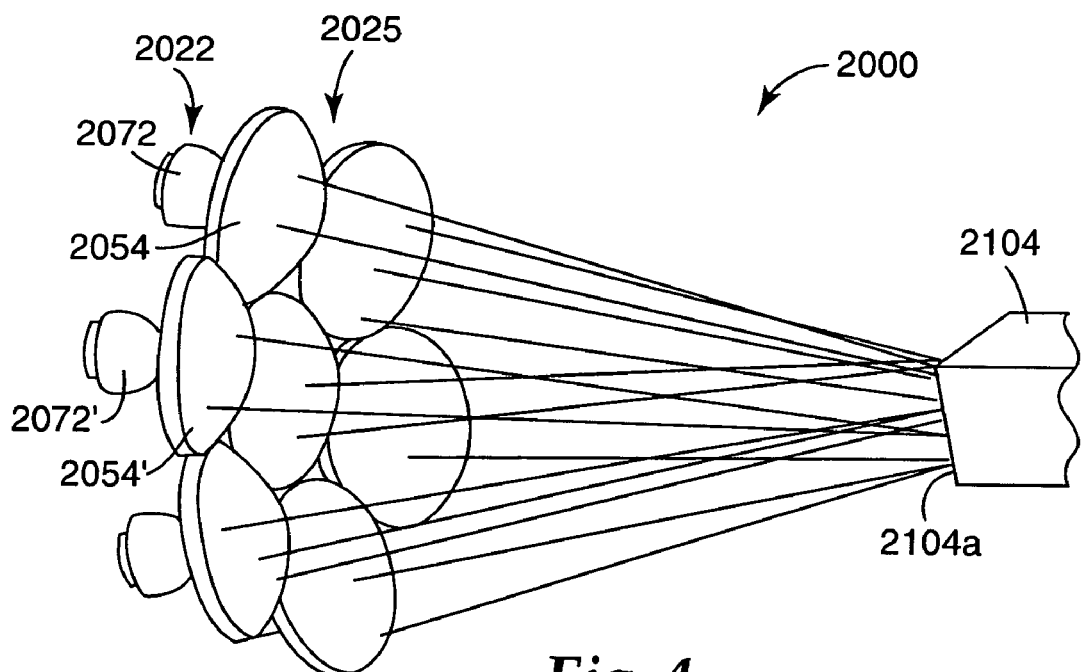
FIG. 4 shows schematically a perspective view of another exemplary bank of light sources suitable for use in some illumination systems constructed according to the present disclosure, in which LEDs or similar light sources are used in combination with refractive arrays to form aimed-in channels.

FIG. 4 shows schematically another exemplary bank of light sources 2000, in which LEDs or similar light sources are used in combination with refractive arrays, assemblies of reflectors, or other optical elements having optical power, to form individual aimed-in channels pointed toward an illumination target, such as the entrance end 2104*a* of an integrator 2104. Examples of such banks of light sources are described in the commonly owned U.S. application Ser. No. 10/776,152 entitled "Illumination System," filed on Feb. 11, 2004, and in the commonly owned U.S. application Ser. No. 10/776,155, entitled "Reshaping Light Source Modules and Illumination Systems Using the Same," filed on Feb. 11, 2004. The disclosures of both applications are hereby incorporated by reference herein to the extent they are not inconsistent with the present disclosure.

The exemplary embodiments shown in FIG. 4 have individual aimed-in channels, which include one or more optical elements associated with each light source, such as one or more lenses directing and focusing at least a portion of the emission of the light sources onto an illumination target. In particular, the bank of light sources 2000 includes a set of light sources 2022, such as light sources 2072, 2072', and a system of optical elements 2025. The individual channels are aimed, for example, by arranging the set of light sources 2022 tangentially to and along a spherical surface. This may be accomplished, for example by mounting the light sources onto a spherically-shaped surface, mounting the light sources individually substantially tangentially to an imaginary spherical surface, or by any other suitable technique. The system of optical elements 2025 preferably utilizes at least one array of refractive optical elements, such as lenses 2054, 2054'. In such exemplary embodiments, a light source and the associated refractive element or elements, for example the light source 2072 and the lens 2054, form each aimed-in channel.

The number and type of light sources and of the optical elements associated with the light sources may vary depending on the application, desired system configuration and the dimensions of the system. For example, in other exemplary embodiments of the present disclosure, the individual aimed-in channels may be configured as described in reference to FIGS. 2A–2C. In such exemplary embodiments, a light source and an associated shaped reflector portion (for example, light sources 1502*a*, 1502*b* and the respective associated reflector portions 1504*a*, 1504*b*, illustrated in FIG. 2B) can form an individual aimed-in channel.

Figure 5A:
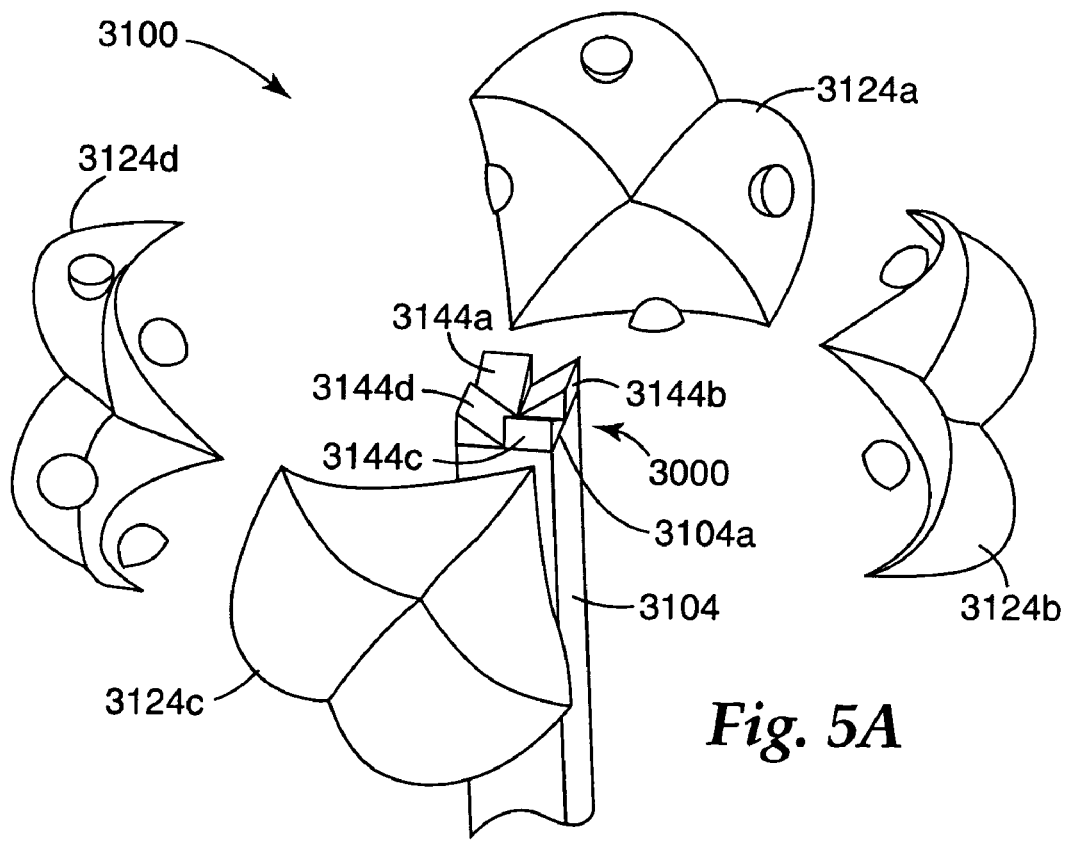
FIG. 5A shows an exemplary arrangement of a bank of light sources in combination with a subdivided aperture arrangement utilizing four prisms.
Figure 5B:
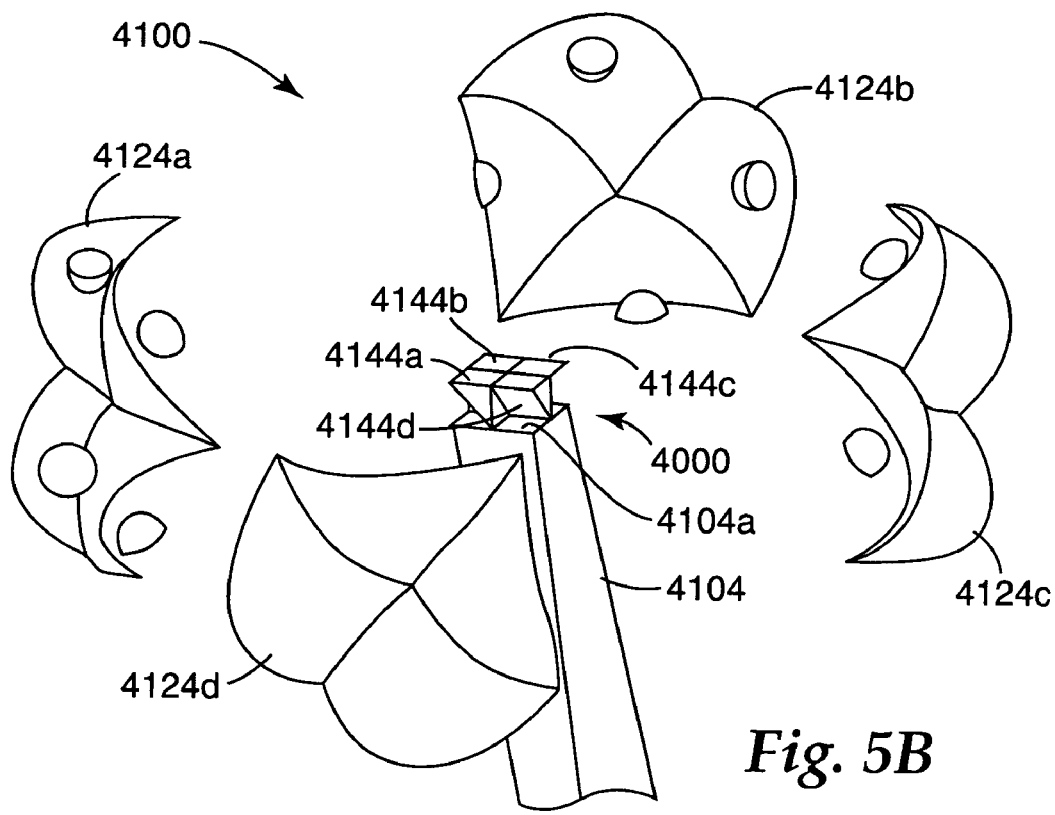
FIG. 5B shows an exemplary arrangement of a bank of light sources in combination with another subdivided aperture arrangement utilizing four prisms.
Figure 5C:
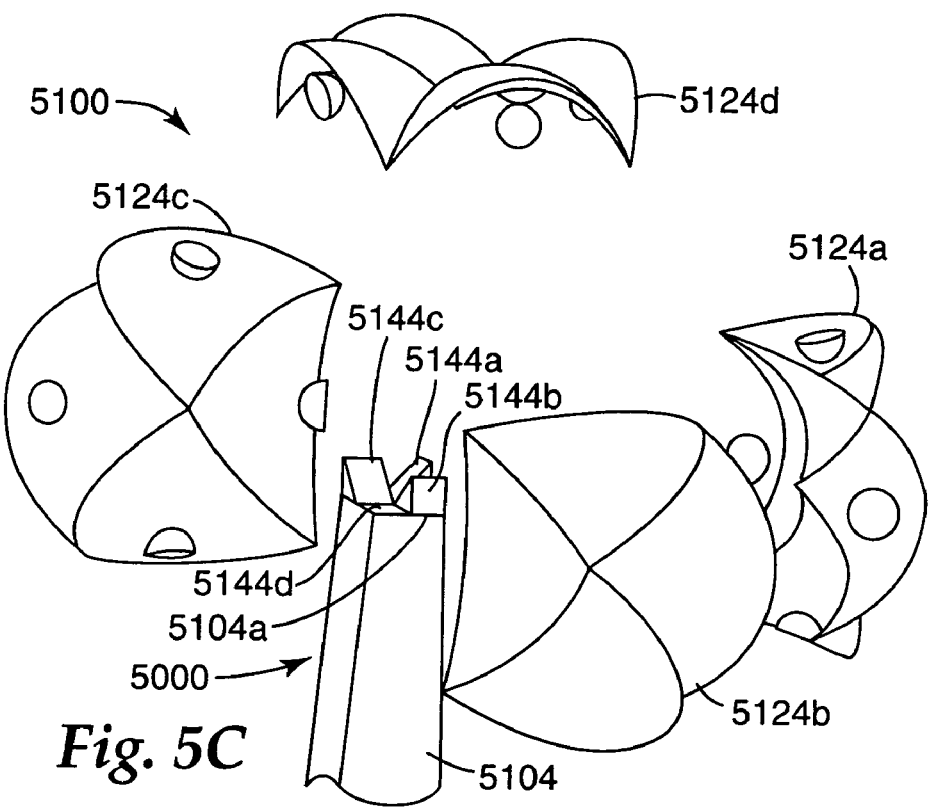
FIG. 5C shows an exemplary arrangement of a bank of light sources in combination with a subdivided aperture arrangement utilizing three prisms.

One technique for coupling more light into an integrator in order to increase the brightness of an illumination system including an integrator involves subdividing the entrance aperture of the integrator, for example, as illustrated in FIGS. 5A–5C. FIG. 5A shows a bank of light sources 3100 in combination with a subdivided aperture arrangement 3000, in which an integrator 3104 has an entrance end 3104*a* subdivided by four prisms 3144*a*, 3144*b*, 3144*c* and 3144*d*.

In the subdivided aperture arrangement 3000, one facet of each prism is disposed over the entrance end 3104*a*, and another facet of each prism can receive light from an arrangement of light sources, such as arrangements described in reference to FIGS. 2A–4. In some exemplary arrangements 3000, the diagonals of prisms 3144*a*, 3144*b*, 3144*c* and 3144*d* are coated with reflective coatings, thus producing reflective surfaces, and each coating may be preferentially constructed for a particular color, for example, by having color-specific reflectivity. The exemplary bank of light sources 3100 includes four light source subassemblies 3124*a*, 3124*b*, 3124*c* and 3124*d*, configured as shown in FIG. 2C. The four subassemblies are disposed so that light from each of the subassemblies 3124*a*, 3124*b*, 3124*c* and 3124*d* is directed to the open facets of the prisms 3144*a*, 3144*b*, 3144*c* and 3144*d*, respectively, reflected at the surfaces of prisms' diagonals, and directed through the entrance end 3104*a* into the integrator 3104.

FIG. 5B shows another exemplary arrangement of a bank of light sources 4100 in combination with a subdivided aperture arrangement 4000, in which an integrator 4104 has an entrance end 4104*a* subdivided by four prisms 4144*a*, 4144*b*, 4144*c* and 4144*d*. In the subdivided aperture arrangement 4000, one facet of each prism is disposed substantially perpendicularly to the plane of the entrance end 4104*a* of the integrator 4104, and another facet of each prism faces away from the entrance end 4104*a*. The diagonal of each prism can receive and reflect light from a bank of light sources, such as those described in reference to FIGS. 2–4. In some exemplary arrangements 4000, the diagonals of prisms 4144*a*, 4144*b*, 4144*c* and 4144*d* are coated with reflective coatings, thus forming reflective surfaces, and each of the coatings may be preferentially constructed for a particular color, for example, by having color-specific reflectivity. The exemplary bank of light sources 4100 includes four light source subassemblies 4124*a*, 4124*b*, 4124*c* and 4124*d*, configured as shown in FIG. 2C. The four subassemblies are disposed so that light from each of the subassemblies 4124*a*, 4124*b*, 4124*c* and 4124*d* is directed to the diagonals of the prisms 4144*a*, 4144*b*, 4144*c* and 4144*d*, respectively, and the surfaces of the prisms' diagonals reflect the light received from the respective light source subassembly through the entrance end 4104*a* and into the integrator 4104.

FIG. 5C shows another exemplary bank of light sources 5100 in combination with a subdivided aperture arrangement 5000, having three prisms 5144*a*, 5144*b* and 5144*c* disposed over the entrance end 5104*a* of an integrator 5104, leaving a portion of the entrance end 5104 clear, thus forming an open portion 5104*d*. One facet of each prism is disposed over the entrance end 5104*a*, while another facet of each prism can receive light from a light source bank, such as those described in reference to FIGS. 2–4. In some exemplary arrangements 5000, the diagonals of the prisms 5144*a*, 5144*b*, and 5144*c* are coated with reflective coatings, thus forming reflective surfaces, and each of the coatings may be preferentially constructed for a particular color, for example, by having color-specific reflectivity.

The bank of light sources 5100 includes four light source subassemblies 5124*a*, 5124*b*, 5124*c* and 5124*d*, configured as shown in FIG. 2C, which are disposed so that their light is directed to the open rectangular facets of the prisms 5144*a*, 5144*b* and 5144*c*, respectively, and reflected at the surfaces of the prisms' diagonals through the entrance end 5104*a* and into the integrator 5104. The fourth subassembly 5124*d* is disposed so that its light is directed to the open portion 5104*d* and enters the integrator 5104. If the integrator is solid, the open portion 5104d may be coated with an anti-reflective coating that is preferentially constructed for illumination of a particular color, for example by having color-specific transmission. Preferably, the subassembly 5124d is disposed substantially along the longitudinal axis of the integrator 5104.

Those of ordinary skill in the art will readily appreciate that, although the figures show subdivision into four sub-apertures, division into other numbers of sub-apertures is also possible and such subdivided aperture arrangements are also within the scope of the present disclosure. The configurations and sizes of prisms may also vary depending on the specific application, size and shape of the integrator, size and shape of the banks of light sources and other factors. For example, the use of inverted trapezoidal and quadrilateral prisms in subdivided aperture arrangements are also within the scope of the present disclosure. Some exemplary embodiments can include mirrors or other suitable components having reflective surfaces (mirror or TIR) that subdivide the entrance end of an integrator, and such mirrors or other suitable components having reflective surfaces can be preferentially constructed for illumination of a particular color, for example, by utilizing color-specific reflective or anti-reflection coatings.

In addition, the configurations of the banks of light sources, for example the configurations, numbers and locations of the light source bank subassemblies, may vary as suitable for a particular application. In the exemplary subdivided aperture arrangements described herein, the prisms, mirrors or other components having reflective surfaces can be mounted, for example, using glue, in a suitable housing before the entrance end of the integrator. In some exemplary embodiments, the prisms, mirrors or other components can be mounted in the integrator housing. Alternatively, they can be attached to a solid integrator with suitable transparent glue or formed integrally as a part thereof.

Figure 6A:
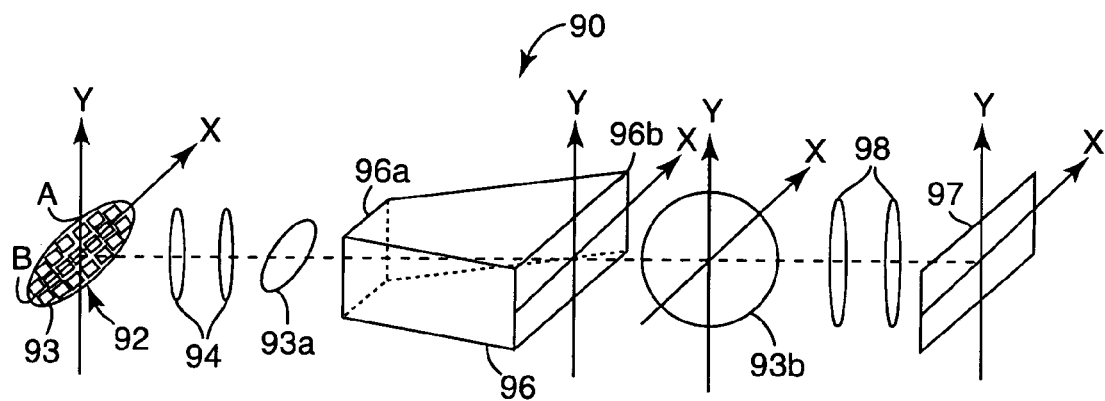
FIG. 6A shows another exemplary arrangement of a bank of light sources with respect to an integrator.

Another exemplary arrangement of a bank of light sources with respect to an integrator is shown in FIG. 6A. Such exemplary arrangements are described in a commonly assigned and concurrently filed U.S. Application of Magarill et al., entitled "Illumination System With Non-Radially Symmetrical Aperture," Attorney Docket No. 59729US002, the disclosure of which is hereby incorporated by reference herein. FIG. 6A shows an exemplary illumination system 90, which includes a bank of light sources 92, optional additional collection optics 94, an integrator 96, relay optics 98 and an image-forming device 97. The exemplary integrator 96 has a generally square entrance end 96a and a generally rectangular exit end 96b.

In some embodiments, the aspect ratio of the entrance end 96a is about 1:1 and the aspect ratio of the exit end 96b is about 16:9, so that the aspect ratio of the entrance end substantially matches the aspect ratio of an emitting surface of a typical currently available LED and the aspect ratio of the exit end substantially matches the aspect ratio of a typical currently available image-forming device, such as LCoS or DLP. Other exemplary embodiments can include integrators having entrance ends of different shapes, such as rectangles with at least one dimension smaller than a corresponding dimension of the exit end, and exit ends of other aspect ratios. In some exemplary embodiments, the relay optics 98 are configured to image the exit end of the integrator 96b onto the image-forming device 97. In most embodiments, the longer dimension of the exit end 96b should be substantially aligned with the longer dimension of the image-forming device 97.

Referring further to FIG. 6A, the bank of light sources 92 is configured so that it has a non-radially symmetrical aperture 93, typically generally elliptical, having a shorter dimension A aligned substantially along the Y axis of the system 90 and a longer dimension B aligned substantially along the X axis of the system 90. In this exemplary embodiment, the longer dimensions of the integrator exit end 96b and of the image-forming device 97 are aligned substantially along the X axis of the system 90, while their shorter dimensions are aligned substantially along the Y axis of the system 90. Such configurations produce an illumination beam of non-radially symmetrical angular intensity distribution, having a larger angular dimension and a smaller angular dimension, illustrated as 93a, in the space of the entrance end of the integrator 96a, which corresponds to the general shape of the aperture 93. In such exemplary embodiments, the larger angular dimension of the angular intensity distribution should be substantially aligned with the larger dimension of the exit end 96b of the integrator. Due to its geometrical configuration, the integrator 96 processes the beam in such a way that it emerges from the exit end 96b as a beam of a more radially symmetrical angular intensity distribution, illustrated as 93b. A more radially symmetrical angular distribution at the exit end of the integrator is usually desirable in projection systems in order to avoid clipping of the light beam by projection optics, which are usually generally circularly symmetrical.

In the exemplary embodiments where the integrators have other shapes of entrance and exit ends, the larger angular dimension of the illumination's angular intensity distribution at the entrance end of the integrator should be aligned substantially along the plane containing the dimension of the integrator that experiences a larger increase from the entrance end to the exit end. In the embodiment shown in FIGS. 6A and 6B, the direction experiencing a larger increase is oriented substantially along the X axis, where a side of the generally square entrance end 96a of the integrator 96 is transformed to a longer side of the generally rectangular exit end 96b of the integrator 96.

Figure 6B:
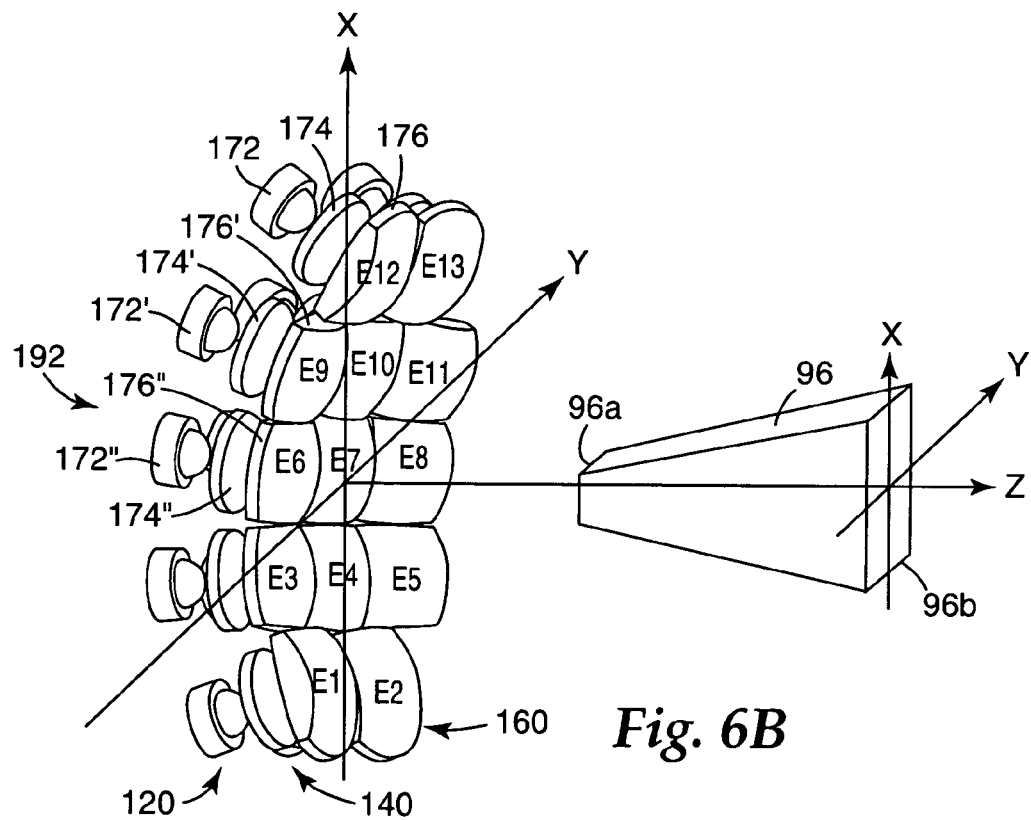
FIG. 6B represents in more detail an exemplary configuration of a bank of light sources, suitable for use in an arrangement illustrated in FIG. 6A.

An exemplary configuration of the bank of light sources 192, suitable for use in a system having a non-radially symmetrical aperture illustrated in FIG. 6A, is presented in FIG. 6B. The bank of light sources 192 includes a set of light sources 120, such as light sources 172, 172', 172", a first set of refractive optical elements 140, such as meniscus lenses 174, 174', 174", and a second set of refractive elements 160, such as plano-convex or double-convex lenses 176, 176', 176". In some exemplary embodiments, the elements of the first set 140 include lenses of generally circular outer shape, while the elements of the second set 160 have generally square or hexagonal outer shapes, so that they can be closely packed to minimize interstitial areas. As shown in FIG. 6B, the set of light sources 120, the first set of refractive elements 140 and the second set of refractive elements 160 are disposed to form an aperture with a generally elliptical outer shape. Preferably, such banks of light sources are configured to form individual aimed-in channels, as described in reference to FIG. 4. However, a variety of different suitable light sources and a variety of optical elements having optical power, such as refractive optical elements and reflective optical elements, of different shapes and sizes may be used in the appropriate embodiments of the present disclosure.

Figure 7:
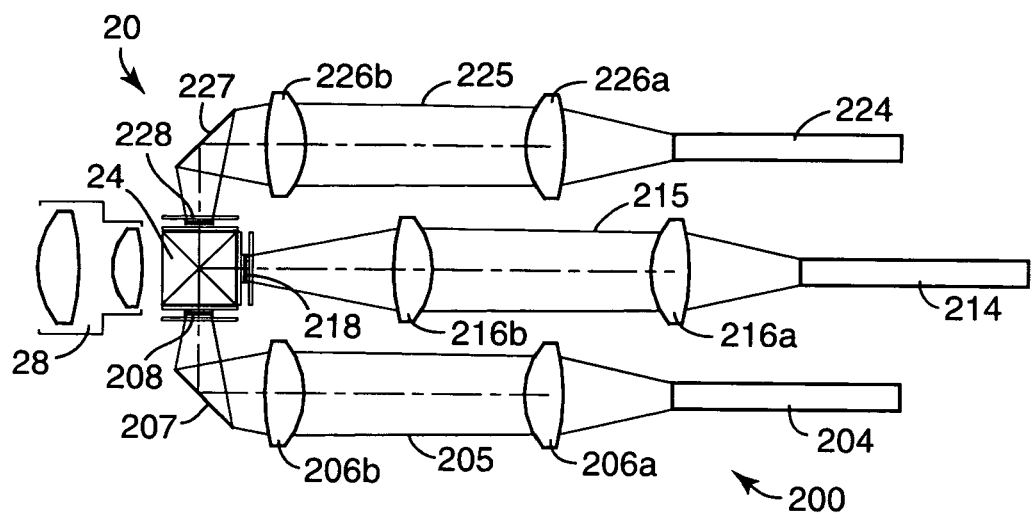
FIG. 7 shows schematically a portion of another 3-panel projection system incorporating an exemplary illumination system constructed according to the present disclosure.

Another embodiment of the present disclosure is illustrated in FIG. 7. FIG. 7 shows schematically a portion of a 3-panel projection system 20 incorporating an exemplary illumination system 200, in which at least a portion of the optical path of each color channel (here, red, green and blue) is not shared with other color channels. In particular, the exemplary illumination system 200 includes channels corresponding to different primary colors, illustrated in FIG. 7 as a red color channel 205, a green color channel 215 and a blue color channel 225. Illumination systems utilizing light sources and channels of other colors, as suitable for a particular application, are also within the scope of the present disclosure.

The red color channel 205 includes a bank of red light sources (not shown), such as red LEDs, a homogenizing optical element, such as an integrator 204, relay optics, such as lenses 206a and 206b or other optical elements having optical power, a fold mirror 207 and an image-forming device 208. Similar to the embodiment illustrated in FIG. 1, the exemplary projection system 20 includes transmissive image forming devices, such as HTPS-LCDs. The green color channel 215 includes a bank of green light sources (not shown), such as green LEDs, a homogenizing optical element, such as an integrator 214, and relay optics, such as lenses 216a and 216b or other optical elements having optical power, and an image-forming device 218. The blue color channel 225, in turn, includes a bank of blue light sources (not shown), such as blue LEDs, a homogenizing optical element, such as an integrator 224, relay optics, such as lenses 226a and 226b or other optical elements having optical power, a fold mirror 227, and an image-forming device 228. In some embodiments of the present disclosure, relay optics are configured to image the exit ends of the integrators 204, 214 and 224 onto the illumination targets 208, 218 and 228.

Light transmitted through and modulated by the red, green and blue image-forming devices, may be combined using a dichroic combiner 24, which is preferably a cross-dichroic combiner, such as known combiners composed of right-angled prisms coated with dichroic coatings. The combined modulated red, green and blue beams are then collected by projection optics 28, such as one or more lenses, for delivery to a screen (not shown) or to another optical element or device for further processing.

Figure 8:
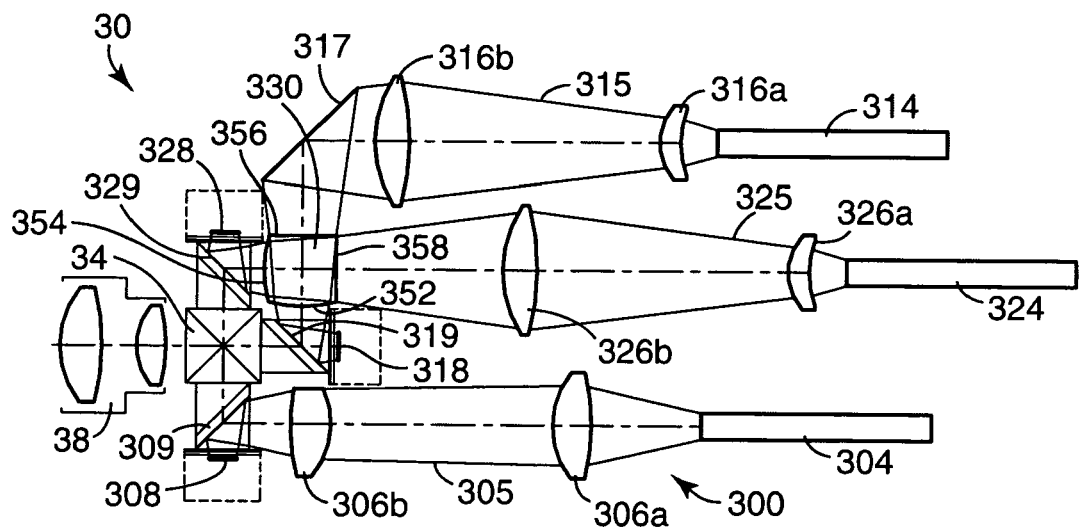
FIG. 8 shows schematically a portion of another exemplary 3-panel projection system incorporating an exemplary illumination system constructed according to the present disclosure.

FIG. 8 illustrates another exemplary embodiment of the present disclosure, which is particularly advantageous for use with reflective image-forming devices, such as LCoS. FIG. 8 shows schematically a portion of a 3-panel projection system 30 incorporating an exemplary illumination system 300, in which at least a portion of the optical path of each color channel (here, red, green and blue) is not shared with other color channels. In particular, the exemplary illumination system 300 includes channels corresponding to different primary colors, illustrated in FIG. 8 as a red color channel 305, a green color channel 315 and a blue color channel 325. Illumination systems utilizing light sources and channels of other colors, as suitable for a particular application, are also within the scope of the present disclosure.

The red color channel 305 includes a bank of red light sources (not shown), such as red LEDs, a homogenizing optical element, such as an integrator 304, relay optics, such as relay lenses 306a and 306b or other optical elements having optical power, a polarizing beam splitter 309, and an image-forming device 308. The relay lens 306b may be truncated as shown to achieve a more compact system. The green color channel 315 includes a bank of green light sources (not shown), such as green LEDs, a homogenizing optical element, such as an integrator 314, relay optics, such as lenses 316a and 316b or other optical elements having optical power, a fold mirror 317, a polarizing beam splitter 319, and an image-forming device 318. The blue color channel 325, in turn, includes a bank of blue light sources (not shown), such as blue LEDs, a homogenizing optical element, such as an integrator 324, relay optics, such as lenses 326a and 326b or other optical elements having optical power, a polarizing beam splitter 329, and an image-forming device 328.

Polarizing beam splitters are useful in the exemplary projection systems that include image-forming devices requiring polarized light for proper operation, such as LCoS. Cartesian polarizing beam splitters suitable for use in the appropriate exemplary embodiments of the present disclosure are described, for example, in Bruzzone et al. U.S. Pat. No. 6,486,997, the disclosure of which is hereby incorporated by reference herein to the extent it is not inconsistent with the present disclosure. Such Cartesian polarizing beam splitters usually include a reflective polarizer encased in a glass cube. Alternatively, traditional MacNeille or other suitable polarizing beam splitters can be used.

Figure 9A:
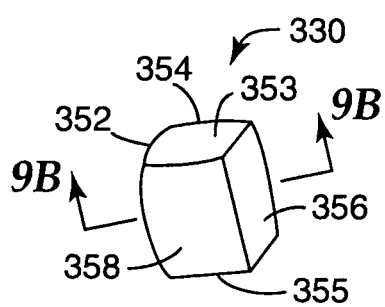
FIG. 9A shows schematically a perspective view of a multi-directional optical element.
Figure 9B:
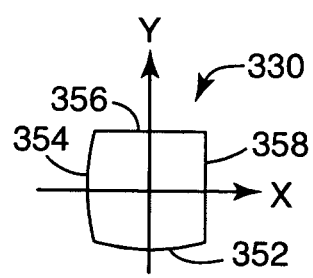
FIG. 9B shows schematically a cross-sectional view of a multi-directional optical element shown in FIG. 9A taken along the direction 9B—9B.

Both the green channel 315 and the blue channel 325 include a multi-directional optical element 330, disposed at the intersection of the green and blue beams. Such a multi-directional optical element is described in a commonly assigned and concurrently filed U.S. Application of Magarill et al., entitled "Multi-Directional Optical Element," Attorney Docket No. 59658US002, the disclosure of which is hereby incorporated by reference herein. The multi-directional optical element 330, configured for use in the system 30 of FIG. 8, is shown in more detail in FIGS. 9A and 9B. FIG. 9A represents a perspective view of the multi-directional optical element 330, and FIG. 9B represents a cross-sectional view, with the cross-section taken along the direction shown in FIG. 9A.

The multi-directional optical element has sides 352 and 356, disposed generally opposite to each other along a first general direction, and sides 354 and 358, disposed generally opposite to each other along a second general direction. The sides 352 and 354 may be disposed adjacent to each other and may have a first radius of curvature, while the sides 356 and 358 may be disposed adjacent to each other and may have a second radius of curvature. The multi-directional optical element 330 may also have two opposing sides 353 and 355, disposed generally opposite to each other along a third direction. The sides 352 and 354 can have different radii of curvature, and so can the sides 356 and 358. The opposing sides 353 and 355 can be substantially planar, or they may be curved, depending on the application. In some embodiments, the sides 353 and 355 have mounting surface structures, such as appropriately shaped protrusions, depressions or both.

In the exemplary illustrated embodiment of the multi-directional element 330, the sides 352 and 354 are convex, while the sides 356 and 358 are concave. In some embodiments, the multi-directional optical element 330 is configured so that light incident onto the side 356 emerges from the opposing side 352, traveling generally along the first direction, while light incident onto the side 358 emerges from the opposing side 354, traveling generally along the second direction. In the typical embodiments, light travels through the multi-directional element along substantially equivalent optical paths in two different directions and is refracted in substantially the same manner. Preferably, the two directions make an angle of about 90 degrees with respect to each other, as illustrated by the axes X and Y in FIG. 9B, but other angles between the two directions are also within the scope of the present disclosure, as may be useful for a particular system configuration. In some embodiments of the present disclosure, light may also travel through the multi-directional element 330 along a third direction, such as from the side 353 to the side 355 or vice versa.

Because illumination from different channels travels through the multi-directional element in different directions, the multi-directional element 330 can be preferentially constructed for the particular colors of such channels. For example, the multi-directional element 330 may include color-specific green anti-reflection coatings on at least one of the sides 356 and 352 and color-specific blue anti-reflection coatings on at least one of the sides 354 and 358. In some embodiments of the present disclosure, curvatures of any one or more of the sides can be different for different colors to reduce color aberrations more effectively. Thus, the multi-directional optical element 330 can help reduce vignetting, aid in configuring a more compact system, and contribute to color-specific preferential construction of the illumination channels.

In some embodiments of the present disclosure, relay optics are configured to image the exit ends of the respective integrators 304, 314 and 324 onto the image-forming devices 308, 318 and 328, respectively. Light modulated by the red, green and blue image-forming devices 308, 318 and 328 may be combined using a cross dichroic combiner 34, described in reference to FIG. 7. The combined modulated red, green and blue beams are then collected by the projection optics 38 for delivery to a screen (not shown) or to another optical element or device for further processing.

Figure 10:
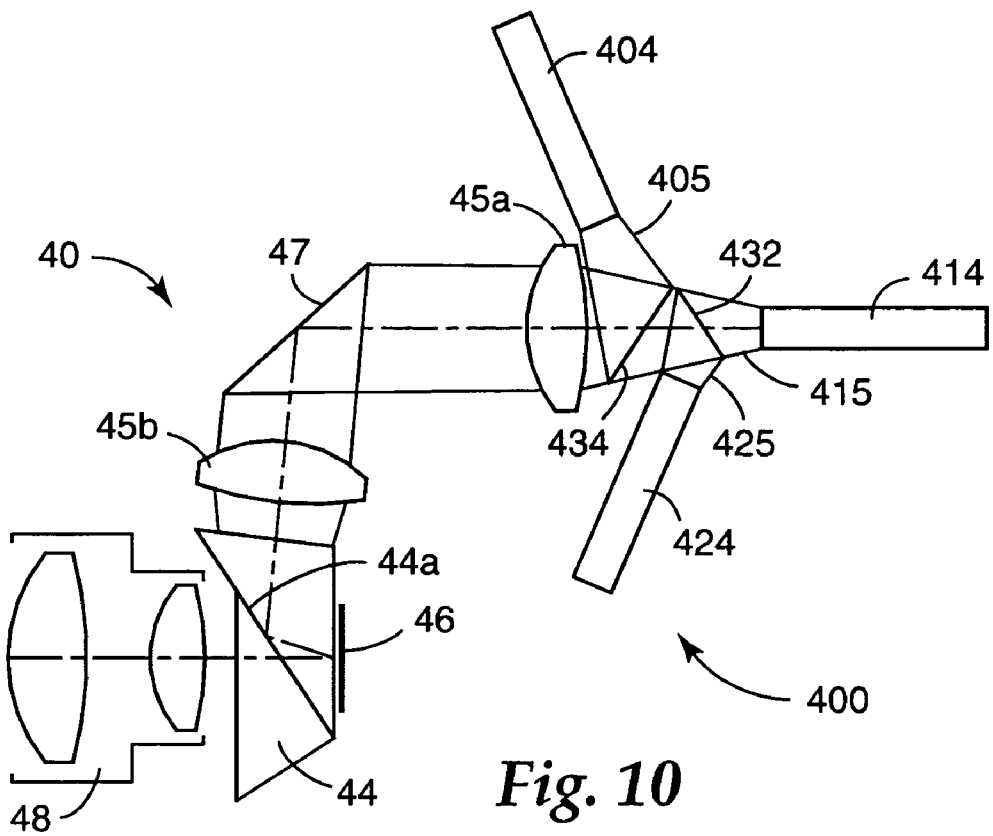
FIG. 10 shows schematically a portion of a one-panel projection system incorporating an exemplary illumination system constructed according to the present disclosure.
Figure 11:
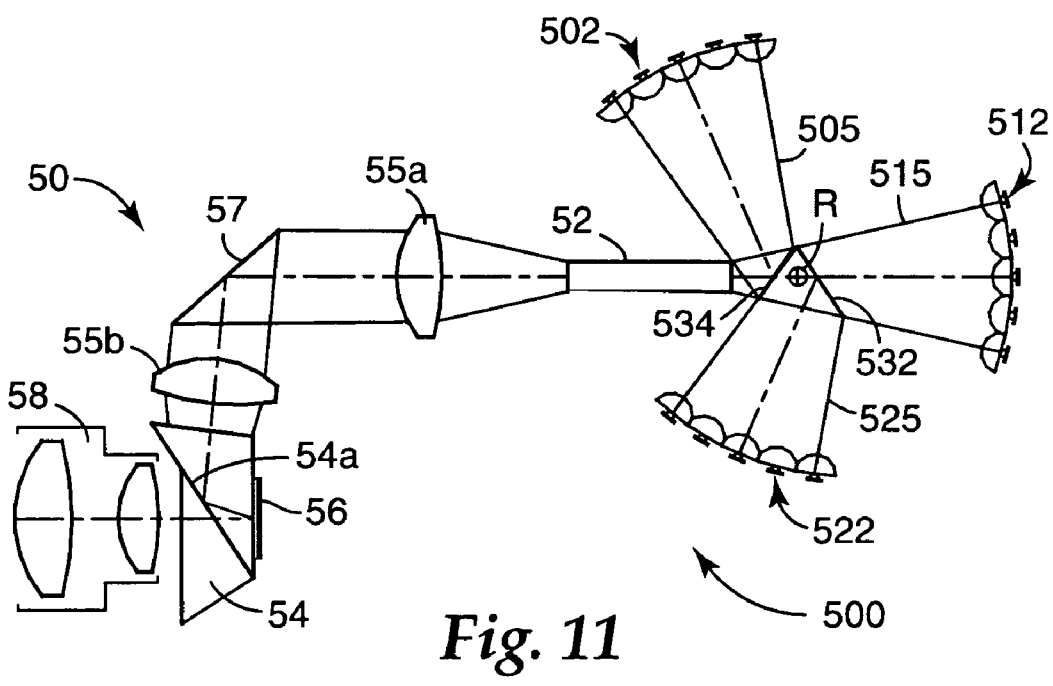
FIG. 11 shows schematically a portion of another one-panel projection system incorporating an exemplary illumination system constructed according to the present disclosure.

Some embodiments of the present disclosure are configured so that light from more than one color channel is delivered to a single image-forming device. Such embodiments are illustrated in FIGS. 10 and 11. FIG. 10 shows schematically a portion of a one-panel projection system 40 incorporating an exemplary illumination system 400 constructed according to the present disclosure, in which at least a portion of the optical path of each color channel (here, red, green and blue) is not shared with other color channels. In particular, the exemplary illumination system 400 includes channels corresponding to different primary colors, illustrated in FIG. 10 as a red color channel 405, a green color channel 415 and a blue color channel 425. Illumination systems utilizing light sources and channels of other colors, as suitable for a particular application, are also within the scope of the present disclosure.

The red color channel 405 includes a bank of red light sources (not shown), such as red LEDs, a homogenizing optical element, such as an integrator 404, and a dichroic mirror 434. The green color channel 415 includes a bank of green light sources (not shown), such as green LEDs, a homogenizing optical element, such as an integrator 414, and dichroic mirrors 432 and 434. The blue color channel 425, in turn, includes a bank of blue light sources (not shown), such as blue LEDs, a homogenizing optical element, such as an integrator 424, and dichroic mirrors 432 and 434. The dichroic mirror 432 is constructed so that it transmits in the green portion of the visible spectrum, while exhibiting relatively high reflectivity in the blue portion of the visible spectrum. Thus, the dichroic mirror 432 transmits green light exiting the green integrator 414 while reflecting light exiting the blue integrator 424 to form a combined beam of green and blue light incident onto the dichroic mirror 434. The dichroic mirror 434, in turn, transmits in the green and blue portions of the visible spectrum, while exhibiting relatively high reflectivity in the red portion of the spectrum. Thus, the dichroic mirror 434 transmits the green and blue light exiting the green and blue integrators, while reflecting the red light exiting the red integrator 404 to form a combined beam of green, blue and red light.

The illumination system 400 of the projection system 40 further includes relay optics, such as relay lenses 45a and 45b, or other optical elements having optical power, a fold mirror 47 disposed between the relay lenses 45a and 45b, a TIR prism assembly 44 and an image-forming device 46, such as a DLP. The projection system 40 further includes projection optics 48. In some embodiments of the present disclosure, the illumination system may be configured so that relay optics image the exit ends of the integrators 404, 414 and 424 onto the image-forming device 46. The TIR prism assembly 44 serves to redirect the light exiting the relay optics onto the image-forming device 46, for example, via reflection at the interface 44a. Light modulated by the image-forming device 46 passes through the TIR prism assembly 44 and is collected by projection optics 48 for delivery to a screen (not shown) or to another optical element or device for further processing.

Another exemplary embodiment of a one-panel projection system is illustrated in FIG. 11. FIG. 11 shows schematically a portion of a one-panel projection system 50 incorporating an exemplary illumination system 500 constructed according to the present disclosure, in which at least a portion of the optical path of each color channel (here, red, green and blue) is not shared with other color channels. In particular, the exemplary illumination system 500 includes channels corresponding to different primary colors, illustrated in FIG. 11 as a red color channel 505, a green color channel 515 and a blue color channel 525. Illumination systems utilizing light sources and channels of other colors, as suitable for a particular application, are also within the scope of the present disclosure.

The red color channel 505 includes a bank of red light sources 502, such as red LEDs, and a dichroic mirror 534. The green color channel 515 includes a bank of green light sources 512, such as green LEDs, and dichroic mirrors 532 and 534. The blue color channel 525, in turn, includes a bank of blue light sources 522, such as blue LEDs, and dichroic mirrors 532 and 534. As in the exemplary embodiment shown in FIG. 10, the dichroic mirror 532 is constructed so that it transmits in the green portion of the visible spectrum, while exhibiting relatively high reflectivity in the blue portion of the visible spectrum. Thus, the dichroic mirror 532 transmits green light emanating from the bank of green light sources 512 while reflecting light emanating from the bank of the blue light sources 522 to form a combined beam of green and blue light incident onto the dichroic mirror 534.

The dichroic mirror 534, in turn, transmits in the green and blue portions of the visible spectrum, while exhibiting relatively high reflectivity in the red portion of the spectrum. Thus, the dichroic mirror 534 transmits the green and blue light incident upon it from the banks of light sources 512 and 522, while reflecting the red light emanating from the bank of red light sources 502 to form a combined beam of green, blue and red light incident onto the entrance of a common integrator 52. In the exemplary embodiment shown, the banks of light sources are configured as shown in and described in reference to FIG. 4, but other suitable configurations of light source banks may be used with this and other embodiments of the present disclosure, including those shown in and described in reference to FIGS. 2–3. If the light sources and the associated refractive elements are disposed generally along and tangentially to spherical surfaces, such surfaces are preferably centered at the entrance end of the integrator 52.

The illumination system 500 of the projection system 50 further includes relay optics, such as relay lenses 55a and 55b or other optical elements having optical power, a fold mirror 57 disposed between the relay lenses 55*a* and 55*b*, a TIR prism assembly 54 and an image-forming device 56, such as a DLP. The projection system 50 further includes projection optics 58. In some embodiments of the present disclosure, the system may be configured so that the relay optics image the exit end of the integrator 52, onto the image-forming device 56. The TIR prism assembly 54 serves to redirect the light exiting relay optics onto the image-forming device 56, for example, via reflection at the facet 54*a*. Light modulated by the image-forming device 56 passes through the TIR prism assembly 54 and is collected by projection optics 58, which may be or may include one or more lenses, for delivery to a screen (not shown) or to another optical element, system or device for further processing.

In the exemplary embodiments of the present disclosure that utilize dichroic mirrors upstream from the image-forming devices, for example, as shown in FIGS. 10 and 11, the dichroic mirrors are disposed in the telecentric space, which helps avoid color non-uniformities or color shift. In addition, the exemplary illumination systems of the present disclosure, such as those shown in FIGS. 10 and 11, can be configured so that angular orientations of the dichroic mirrors results in relatively small ranges of angles of incidence, such as about 2 degrees or less, which usually reduces polarization-related shifting of the reflection and transmission wavelengths.

Figure 11A:
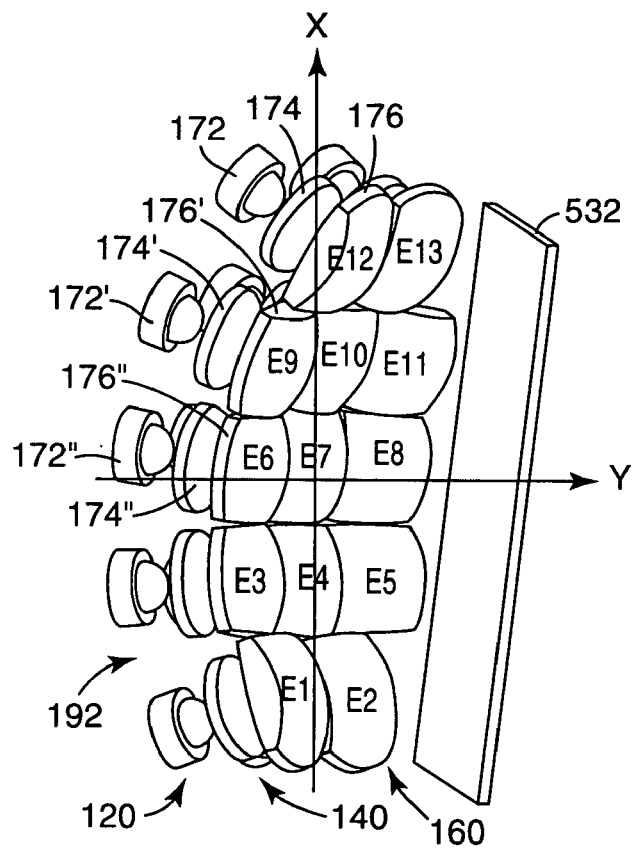
FIG. 11A illustrates the placement of an exemplary light source bank having the non-radially symmetrical aperture, illustrated in FIGS. 6A and 6B, with respect to a dichroic mirror in the systems similar to that shown in FIG. 11.

In the exemplary embodiments utilizing light source banks having non-radially symmetrical apertures, such as those shown in FIGS. 6A and 6B, in the systems similar to that shown in FIG. 11, the longer dimension of the light source bank should be arranged substantially parallel to the axis of rotation (or tilt) of the dichroic mirrors, which is designated as R in FIG. 11, and oriented generally orthogonal to the plane of the figure. Such orientation and arrangement, illustrated in more detail in FIG. 11A, is desirable, because the longer dimension of the bank of light sources corresponds to the larger angle of the incident cone of light. Reducing variation of the angles of incidence onto the dichroics could help reduce color shift.

Figure 12B:
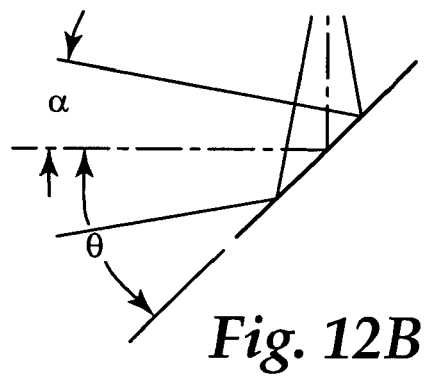
FIG. 12B shows schematically orientation of the dichroic reflective coating characterized in FIG. 12A with respect to the incident illumination.
Figure 12A:
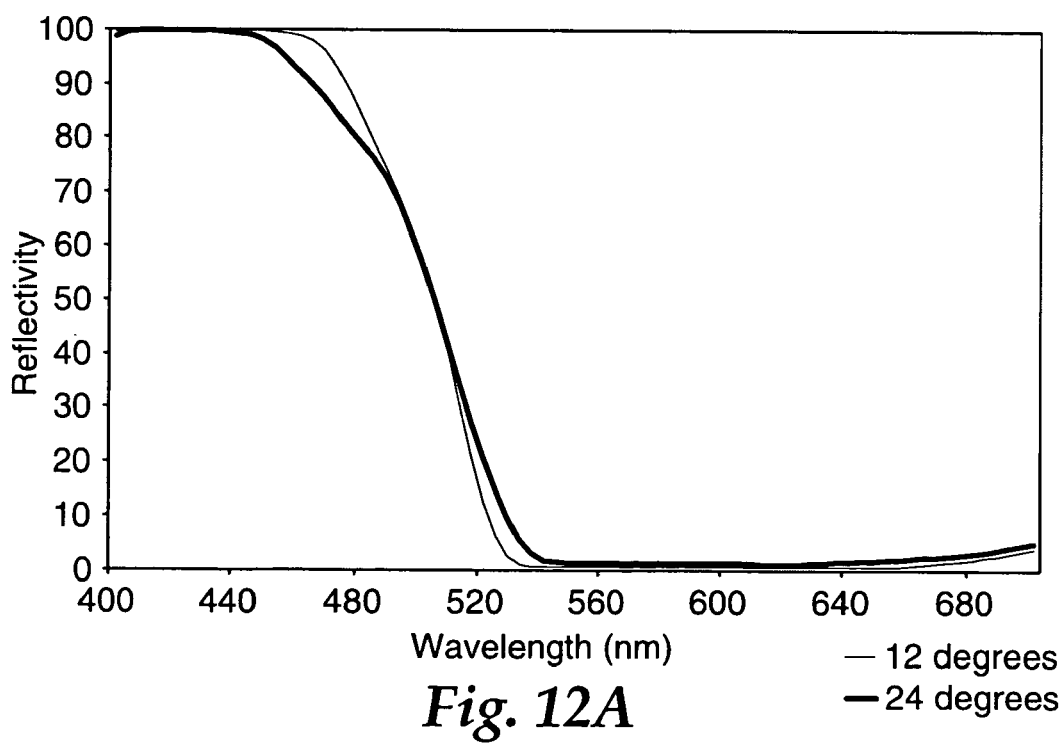
FIG. 12A represents a graph showing reflectivity for random polarization versus wavelength, demonstrating the performance of a dichroic reflective coating on a plane-parallel plate for two cones of light, about 12° and about 24°.

In addition, exemplary embodiments of the present disclosure allow the use of dichroics at a glass/air interface. This is beneficial, because in such configurations the dependence of the reflective characteristics of light having random polarization on the angle of incidence is reduced, resulting in more efficient color combining. To illustrate this concept, FIG. 12A represents a graph showing reflectivity for random polarization versus wavelength, demonstrating the performance of a typical dichroic coating on a plane-parallel plate for two cones of light, about 12° and about 24°. The plate was oriented at an angle θ of about 45 degrees to the chief ray of the illumination, as shown on FIG. 12B. As it is evident from FIG. 12A, the dichroic performance (or ability to separate light by wavelength) degrades only slightly with increasing the cone angle of incident light. On the other hand, the performance of a typical solid glass dichroic combiner is generally inferior for light with random polarization incident at an angle of about 45 degrees.

As explained above, the exemplary illumination systems constructed according to the present disclosure have different color channels, such that at least a portion of the optical path of each color channel (here, red, green and blue) is not shared with other color channels. Thus, optical elements that are not shared by different color channels do not need to be color-corrected for the colors of different channels, allowing significant cost savings and increased ease of manufacturing. Furthermore, the optical elements or systems of optical elements that lie in the optical path of only one color channel may be preferentially constructed, preferentially positioned, or both, for the color of that illumination channel.

In the context of the present disclosure, the terms "preferentially constructed" and "preferentially positioned" encompass any feature or positioning of the optical elements the terms refer to that would improve the performance, such as transmission or correction of aberrations, of a particular color channel to at least some degree. More specifically, an optical element is preferentially constructed or preferentially positioned for the color of its illumination channel where that channel's performance would decrease if such element were constructed or positioned as a corresponding element, if any, of another illumination channel. For example, the integrators can be preferentially constructed for the color of their respective illumination channels by being coated with color-specific coatings, which may improve their throughput by about 8% as compared to integrators coated with a currently available broadband reflective SILFLEX-VIS™ coating developed by Unaxis Company.

Additionally or alternatively, optical elements having optical power, such as the refractive and reflective elements shown and described herein, may be preferentially constructed by being coated with color-specific anti-reflection or other coatings, which would also increase transmission of light through the system. Furthermore, such optical elements or systems of optical elements that are not shared by different color channels may be preferentially constructed or preferentially positioned for the colors of their respective channels by having different configurations for different colors. For example, the shapes, positions and/or numbers of optical elements may be different in different color channels in order to reduce aberrations. Thus, the present disclosure allows increased flexibility in improving brightness of illumination systems, such as illumination systems for projection applications.

In applications such as projection television, typical illumination systems should use light having certain proportions of red, green and blue primary components to provide a desired color temperature on a screen. Often, one of the components is the limiting factor on the system performance. In some exemplary illumination systems having at least partially separate optical paths for different color channels, additional brightness can be achieved by including light sources (or groups of light sources) of different shades within the wavelength range of a particular color channel. Each such light source or group of light sources has a different peak wavelength and their illumination may be combined with wavelength-selective elements, such as dichroic mirrors, or with diffractive optics, such as diffraction gratings. Any light sources with relatively narrow spectra can be used, for example, LEDs, lasers, or phosphorescent materials.

Figure 13:
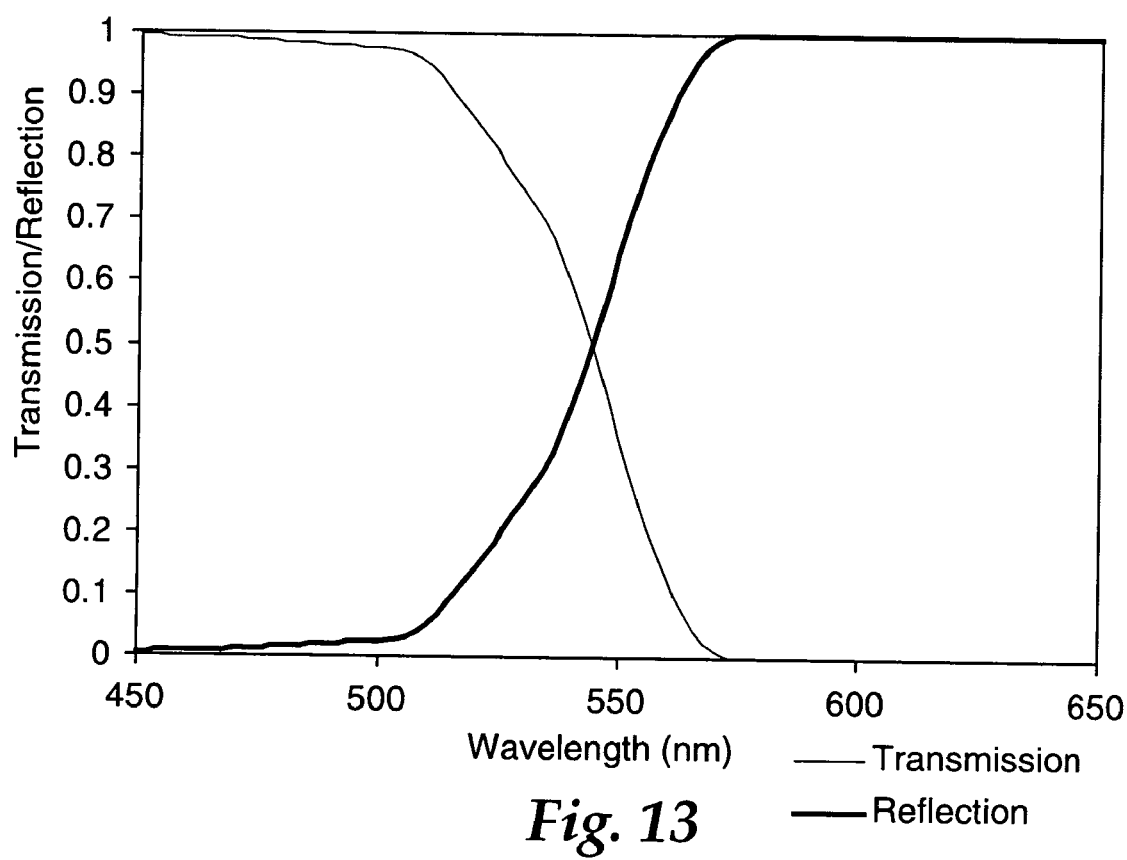
FIG. 13 illustrates modeled transmission and reflection performance characteristics of a dichroic combiner suitable for combining different shades of green LEDs into the same color channel.
Figure 14:
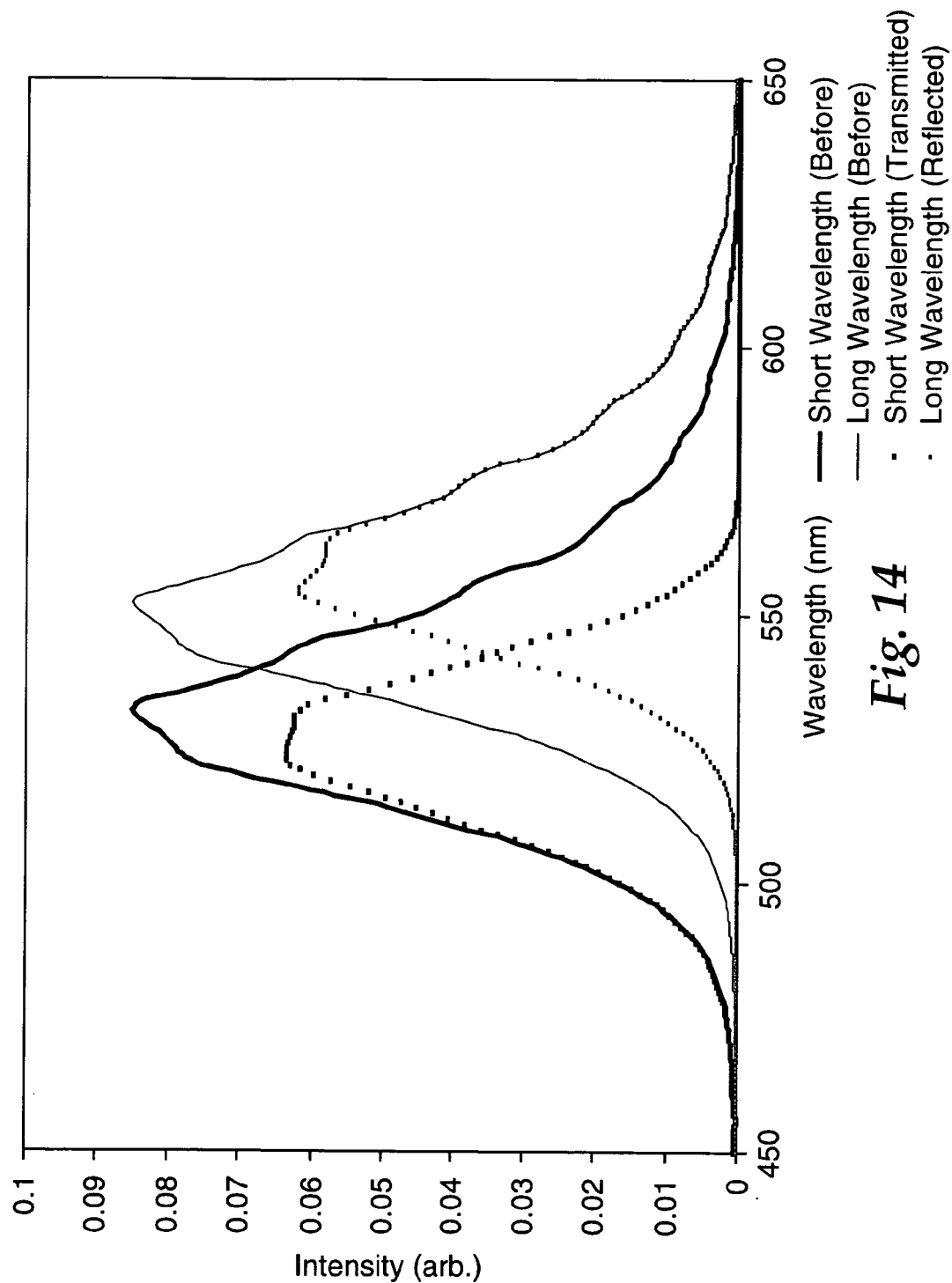
FIG. 14 shows spectra of two groups of green LEDs of different shades, before (solid lines) and after (dotted lines) a dichroic combiner with the performance illustrated in FIG. 13.

FIG. 13 illustrates modeled transmission and reflection performance characteristics of a dichroic mirror suitable for combining different shades of green LEDs into the same color channel. Such a dichroic mirror may be suitably placed between the groups of LEDs to combine their illumination, as it has been explained for combining different color illumination in the appropriate exemplary embodiments of the present disclosure. The dichroic mirror was modeled as a 32-layer thin film coating with about 45-degree angle of incidence of the principal ray with an about +/−6 degree cone of incident light. The transmission and reflection curves are shown for p-polarization, which is suitable for LCoS systems and other systems that use polarized light. FIG. 14 shows spectra of two groups of green LEDs of different shades, before (solid lines) and after (dotted lines) a dichroic mirror with the performance illustrated in FIG. 13. The two LED spectra shown were created by shifting as needed a measured spectrum from a Luxeon™ LXHL-PM09 green emitter, available from Lumileds Lighting Company, so that the mean wavelength of the combined spectrum would provide a desired color.

Figure 15:
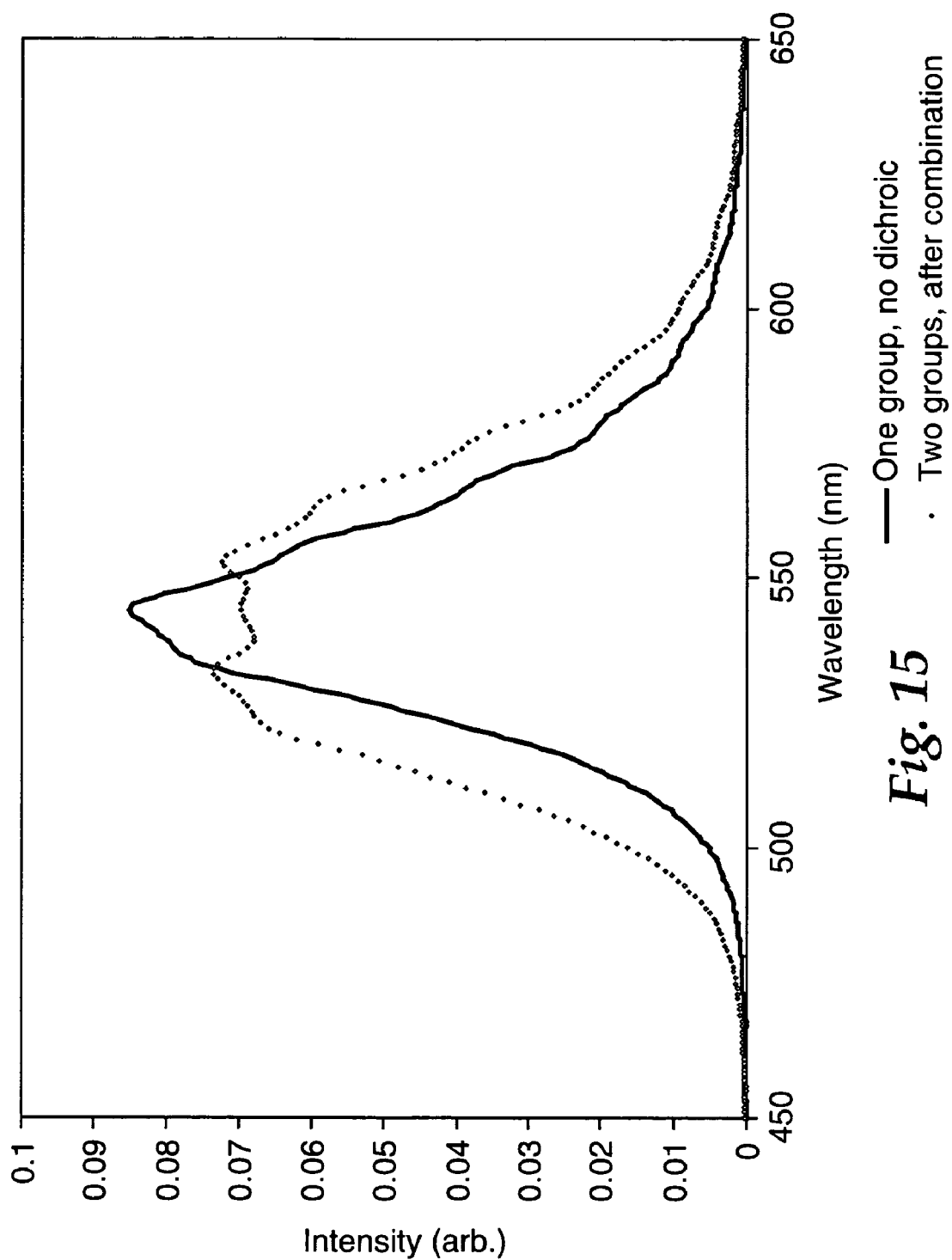
FIG. 15 represents a comparison of the emission spectrum of a group of green LEDs of the same type (solid line) with the spectra of two groups of LEDs of different color shades having offset peak wavelengths that were combined with a dichroic (dotted line)
Figure 16:
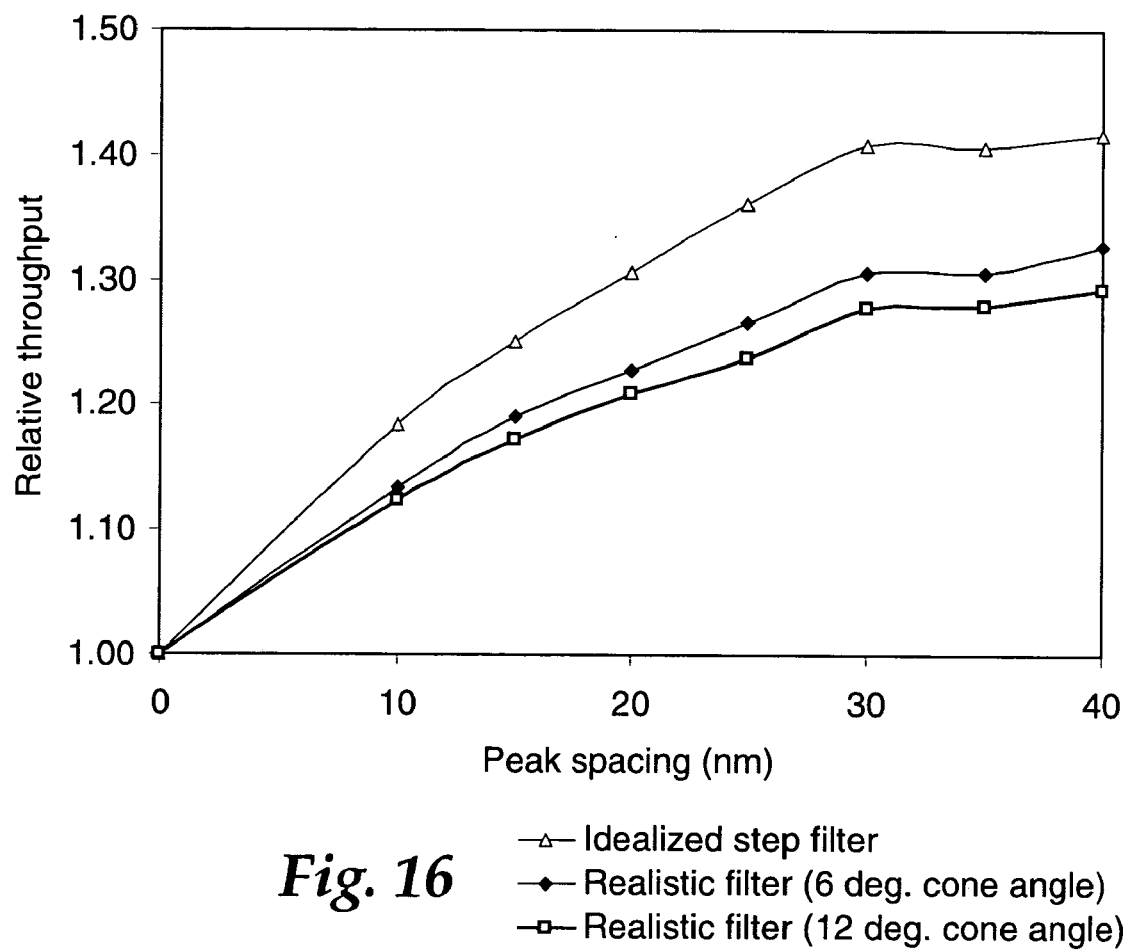
FIG. 16 shows plots representing fractional increase in the net luminous flux realized by combining the two groups of LEDs with the performance illustrated in FIGS. 14 and 15 as a function of the peak-to-peak spacing of the LED spectra.

FIG. 15 represents a comparison of the emission spectrum of a group including an arbitrary number N of green LEDs of the same type (solid line) with the spectra of two groups, each group having N LEDs, of different color shades having offset peak wavelengths that were combined with a dichroic mirror (dotted line). Thus, by combining two groups of LEDs, a net gain in overall lumens throughput can be achieved, as illustrated in FIG. 16. FIG. 16 shows plots representing calculated fractional increase in the net luminous flux realized by combining the two groups of LEDs with the performance illustrated in FIGS. 14 and 15 as a function of the peak-to-peak spacing of the LED spectra. Different curves correspond to the modeled performance of a dichroic mirror operating as an idealized step filter, a dichroic mirror operating as a realistic filter for about 6-degree half-angle incident cone of light, and a dichroic mirror operating as a realistic filter for about 12-degree half-angle of the incident cone.

It has been found that the calculated fractional increase in the net luminous flux increased as the peak spacing was increased from about 0 to about 40 nm. Thus, for the modeled exemplary light sources characterized in FIGS. 13–15 (about 20 nm peak-to-peak spacing and about 6 degree cone half-angle), about 22% more lumens are provided by the illumination system utilizing LEDs of different shades. It has been found that the peak spacing of the LEDs can be increased up to 40 nm before the color coordinates of the green channel fall short of the guidelines prescribed by SMPTE C colorimetry. Thus, more light can be coupled into the system, at the expense of a certain amount of color saturation, by creating a combined spectrum that is wider than that of an individual source. Because the spectrum of a single typical high brightness LED is usually narrow enough that the color saturation of the resulting channel is better than required for typical projection television applications, the extra spectral region may be used to couple light from additional LEDs of different shades. In doing so, the breadth of the combined spectrum should be balanced against the acceptable level of color saturation.

Exemplary illumination systems may be constructed according to the present disclosure based on FIG. 8, with red, green and blue color channels, with the following exemplary parameters, which have been determined by modeling. The green bank of light sources is configured and disposed with respect to the integrator 314 as shown in and described in reference to FIG. 5C. Each reflector subassembly, constructed as shown in FIG. 2C, includes four LED light sources 1602, such as Luxeon™ III Emitters, LXHL-PM09, available form Lumileds Lighting Company. The subdivided aperture arrangement, such as that shown in FIG. 5C, includes three right-angle prisms with dimensions of about 4.5×4.5×4.5 mm, material BK7, disposed in front of the entrance aperture of the integrator 314. The diagonal reflective surfaces of the prisms are coated with green reflective coatings, such as a dielectric or metallic reflective coating.

The reflectors, here substantially elliptical and made of acrylic, may be hollow or solid. Both exemplary elliptical reflectors have substantially the same shapes of coated reflective surfaces with the radius of about 10.8 mm and a conic constant of about −0.64. The larger half-diameter of the elliptical reflectors is about 30 mm, the smaller half-diameter is about 18 mm, and the LED is disposed on the longer diameter of the ellipse about 24 mm from its center and at the primary focus of the reflector. The individual reflector portions are formed by truncating a quarter of the ellipse at about 20 degrees from the longer diameter. In the solid version of the green reflector, a cutout with the radius of about 2.8 mm is made to accommodate the placement of an LED, and the reflector is truncated along a spherical surface with the radius of about 24 mm, centered at the secondary focus. Secondary foci of the elliptical reflectors should be at the centers of the entrance sides, such as facets, of the corresponding prisms or at the center of the open portion of the integrator entrance end.

Blue and red color channels have similarly configured banks of light sources, such as those shown in FIG. 2A. The red and blue banks of light sources include 6 LEDs each, such as Luxeon™ Emitters, LXHL-PD01, for the red channel, and Luxeon™ III Emitters, LXHL-PRO9, for the blue channel. The red and blue reflectors, here substantially elliptical and made of acrylic, may be hollow or solid. Both exemplary elliptical reflectors have substantially the same shapes of coated reflective surfaces with the radius of about 10.5 mm and a conic constant of about −0.723. The larger half-diameter of the elliptical reflectors is about 38 mm, the smaller half-diameter is about 20 mm, and the LED is disposed on the longer diameter of the ellipse about 32.1 mm from its center. The individual reflector portions are formed by truncating a quarter of the ellipse at about 18 degrees from the longer diameter. In the solid version of the green reflector, a cutout with the radius of about 2.8 mm is made to accommodate the placement of an LED, and the reflector is truncated along a spherical surface with the radius of about 32.31 mm, centered at the secondary focus. Secondary foci of the elliptical reflectors should be centered at the centers of their respective integrator entrance ends.

All integrators of this exemplary embodiment have the same geometry: about 9.0×9.0 mm entrance end, about 75.0 mm length, and about 9.0×16.0 mm exit end. However, integrators for different color channels are manufactured with different color-specific coatings, preferentially constructed for a particular color illumination. Additional fold mirrors can be inserted into the blue channel between the relay lens 326b and the four-sided element 330 and into the red channel between the relay lenses 306a and 306b. The following Tables 1–5 show other exemplary optical system parameters for the green, blue and red channels.

TABLE 1

Green Channel

| | Surface | Radius (mm) | Distance to the Next Surface (mm) | Material | Clear Aperture (mm) | Conic Constant |
|---|---|---|---|---|---|---|
| Exit End of Integrator 314 | | | 12.00 | | 9.0 × 16.0 | |
| Relay Lens 316a | 1 | 31.062 | 6.90 | SK5 n = 1.5891 | 22.0 | |
| | 2 | 18.818 | 82.8 | | 24.6 | |
| Relay Lens 316b | 3 | −62.391 | 11.24 | Acrylic n = 1.4917 | 42.2 | −3.5578 |
| | 4 | 40.284 | 25.00 | | 42.8 | |
| Mirror | 5 | | 29.71 | | 56 × 32 | |
| Multi-Directional Element | 6 | 603.87 | 23.36 | Acrylic n = 1.4917 | 23.36 × 23.36 (from the vertex) × 27 (height) | |
| | 7 | 40 | 4.5 | | | |

TABLE 2

Aspherical coefficients for an exemplary relay lens 316b.

| | D | E | F | G | H |
|---|---|---|---|---|---|
| 3 | 2.270967E−6 | 4.541643E−9 | −2.833322E−13 | −2.620092E−14 | 3.432419E−17 |

TABLE 3

Blue channel

| | Surface | Radius (mm) | Distance to the Next Surface (mm) | Material | Clear Aperture (mm) | Conic Constant |
|---|---|---|---|---|---|---|
| Exit End of Integrator 324 | | | 12.21 | | 9.0 × 16.0 | |
| Relay Lens 326a | 1 | 31.062 | 6.90 | SK5 n = 1.5891 | 22.0 | |
| | 2 | 18.818 | 82.12 | | 24.6 | |
| Relay Lens 326b | 3 | −62.391 | 11.24 | Acrylic n = 1.4917 | 42.2 | −3.5578 |
| | 4 | 40.284 | 25.00 | | 42.8 | |
| Mirror | 5 | | 28.01 | | 56 × 32 | |
| Multi-Directional Element | 6 | 603.87 | 23.36 | Acrylic n = 1.4917 | 23.36 × 23.36 (from the vertex) × 27(height) | |
| | 7 | 40 | 4.5 | | | |

TABLE 4

Aspherical coefficients for an exemplary relay lens 326b

| ## | D | E | F | G | H |
|---|---|---|---|---|---|
| 3 | 2.270967E−6 | 4.541643E−9 | −2.833322E−13 | −2.620092E−14 | 3.432419E−17 |

TABLE 5

Red channel

| | Surface | Radius (mm) | Distance to the Next Surface (mm) | Material | Clear Aperture (mm) | Conic Constant |
|---|---|---|---|---|---|---|
| Exit End of Integrator 304 | | | 36.7 | | 9.0 × 16.0 | |
| Relay Lens | 1 | −72.416 | 13.0 | Acrylic | 35.1 | 2.3068 |

TABLE 5-continued

Red channel

| Surface | Radius (mm) | Distance to the Next Surface (mm) | Material | Clear Aperture (mm) | Conic Constant |
|---|---|---|---|---|---|
| 306a | | | n = 1.4917 | | |
| | 2 | 23.369 | 50.00 | | 35.1 | −1.4753 |
| Mirror | | | 22.62 | | 40 × 21 | |
| Relay Lens 306b | 3 | −23.369 | 13.0 | Acrylic n = 1.4917 | 35.1 diameter | −1.4753 |
| | 4 | 72.416 | 13.48 | | truncated on one side to radius of 12 | 2.3068 |

Alternatively, the general layout of the illumination system shown in FIG. 8, with red, green and blue channels, may be extended to include banks of LED light sources, such as green Luxeon™ III Emitters, LXHL-PM09, red Luxeon™ Emitters, LXHL-PD01, and blue Luxeon™ III Emitter, LXHL-PRO9, configured and disposed with respect to their respective integrators as shown in and described in reference to FIGS. 6A and 6B. The red, green and blue banks of light sources are all configured substantially as shown in FIG. 6B and each includes 13 LEDs disposed along a spherical surface. First and second lenses, such as 174 and 176, are disposed in front of each LED as shown. The distance from the vertex of each second lens to the center of the integrator entrance end 96a is about 50.0 mm. Other design parameters of the LED banks and the integrators are presented in Table 6:

TABLE 6

Design parameters of LED banks and integrators

| | Surface | Radius (mm) | Distance to the Next Surface (mm) | Material | Clear Aperture (mm) | Conic Constant |
|---|---|---|---|---|---|---|
| LED Dome | | 2.800 | 3.17 | | 5.6 | |
| First Lens 174 | 1 | 24.702 | 4.00 | Acrylic n = 1.4917 | 9.82 | 11.664 |
| | 2 | 6.574 | 0.02 | | 11.40 | |
| Second Lens 176 | 3 | −44.133 | 6.00 | Acrylic n = 1.4917 | square 6.1 × 6.1 | |
| | 4 | 9.39 | 50.00 | | | −1.3914 |
| Integrator 96 | | | (6.1 × 6.1) × 50.0 × (6.1 × 10.7) mm | | | |

The banks of light sources are arranged on a spherical surface by rotation of the LEDs with associated first and second lenses of condenser subassembly around the center of integrator entrance window. Angles of rotation in the XZ and YZ planes are shown in Table 7 in degrees:

TABLE 7

Angular coordinates of cluster elements

| Element | Rotation in X plane (degrees) | Rotation in Y plane (degrees) |
|---|---|---|
| 1 | −6.5 | −26 |
| 2 | 6.5 | −26 |
| 3 | −13 | −13 |

TABLE 7-continued

Angular coordinates of cluster elements

| Element | Rotation in X plane (degrees) | Rotation in Y plane (degrees) |
|---|---|---|
| 4 | 0 | −13 |
| 5 | 13 | −13 |
| 6 | −13 | 0 |
| 7 | 0 | 0 |
| 8 | 13 | 0 |
| 9 | −13 | 13 |
| 10 | 0 | 13 |
| 11 | 13 | 13 |

TABLE 7-continued

Angular coordinates of cluster elements

| Element | Rotation in X plane (degrees) | Rotation in Y plane (degrees) |
|---|---|---|
| 12 | −6.5 | 26 |
| 13 | 6.5 | 26 |

All integrators of this exemplary embodiment have the same geometry: about 6.1×6.1 mm entrance end, about 50.0 mm length, and about 6.1×10.7 mm exit end. Integrators for different color channels are manufactured with different color-specific coatings preferentially constructed for a particular color. Additional fold mirrors can be inserted into the blue channel between the relay lens 326b and the four-sided element 330 and into the red channel between the relay lenses 306a and 306b. The following Tables 8–5 show other exemplary optical system parameters for the green, blue and red channels.

TABLE 8

Green channel

| | Surface | Radius (mm) | Distance to the Next Surface (mm) | Material | Clear Aperture (mm) | Conic Constant |
|---|---|---|---|---|---|---|
| Exit End of Integrator 314 | | | 9.25 | | 6.1 × 10.7 | |
| Relay Lens 316a | 1 | 31.062 | 6.90 | SK5 n = 1.5891 | 22.0 | |
| | 2 | 18.818 | 62.73 | | 24.6 | |
| Relay Lens 316b | 3 | −59.84 | 14.31 | Acrylic n = 1.4917 | 40.0 | −3.9032 |
| | 4 | 39.703 | 45.00 | | 41.0 | |
| Mirror | 5 | | 33.38 | | 50 × 30 | |
| Multi-Directional Element | 6 | 603.87 | 23.36 | Acrylic n = 1.4917 | 23.36 × 23.36 (from the vertex) × 27 (height) | |
| | 7 | 40 | 4.5 | | | |

TABLE 9

Aspherical coefficients of an exemplary relay lens 316b

| | D | E | F | G | H |
|---|---|---|---|---|---|
| 3 | 2.419263E−6 | 3.834464E−9 | −3.443946E−14 | −2.223959E−14 | 2.932641E−17 |

TABLE 10

Blue channel

| | Surface | Radius (mm) | Distance to the Next Surface (mm) | Material | Clear Aperture (mm) | Conic Constant |
|---|---|---|---|---|---|---|
| Exit End of Integrator 324 | | | 9.06 | | 6.1 × 10.7 | |
| Relay Lens 326a | 1 | 31.062 | 6.30 | SK5 n = 1.5891 | 22.0 | |
| | 2 | 18.818 | 61.89 | | 24.6 | |
| Relay Lens 326b | 3 | −59.84 | 14.31 | Acrylic n = 1.4917 | 40.0 | −3.9032 |
| | 4 | 39.703 | 45.00 | | 41.0 | |
| Mirror | 5 | | 32.14 | | 50 × 30 | |
| Multi-Directional Element | 6 | 603.87 | 23.36 | Acrylic n = 1.4917 | 23.36 × 23.36 (from the vertex) × 27 (height) | |
| | 7 | 40 | 4.5 | | | |

TABLE 11

Aspherical coefficients of an exemplary relay lens 326b

| | D | E | F | G | H |
|---|---|---|---|---|---|
| 3 | 2.419263E−6 | 3.834464E−9 | −3.443946E−14 | −2.223959E−14 | 2.932641E−17 |

TABLE 12

Red channel

| Surface | | Radius (mm) | Distance to the Next Surface (mm) | Material | Clear Aperture (mm) | Conic Constant |
|---|---|---|---|---|---|---|
| Exit End of Integrator 304 | | | 39.78 | | 6.1 × 10.7 | |
| Relay Lens 306a | 1 | −38.556 | 14.00 | Acrylic n = 1.4917 | 35.1 | −3.1897 |
| | 2 | 29.466 | 65.00 | | 35.1 | −1.6000 |
| Mirror | 3 | | 26.72 | | 41 × 24 | |
| Relay Lens 306b | 4 | −19.059 | 11.00 | Acrylic n = 1.4917 | 32 diameter truncated on one side to radius of 12 | −0.3957 |
| | 5 | −45.525 | 12.78 | | | |

Illumination systems constructed according to the present disclosure have a variety of advantages. For example, such illumination systems are particularly convenient for use with LED light sources, which have increased lifetime as compared to the traditional high-pressure mercury arc lamps, lower cost, better environmental characteristics, and do not emit infrared or ultraviolet light, eliminating the need for UV filters and cold mirrors. In addition, LEDs are driven by low voltage DC electrical power, which is much less likely to cause electrical interference with the sensitive display electronics than does the high voltage AC ballast that drives an arc lamp. Furthermore, due to their relatively narrow bandwidth, LEDs provide better color saturation without sacrificing brightness.

Although the illumination systems of the present disclosure have been described with reference to specific exemplary embodiments, those of ordinary skill in the art will readily appreciate that changes and modifications can be made thereto without departing from the spirit and scope of the present invention. For example, dimensions and configurations of the systems of optical elements that are used in various embodiments of the present disclosure can vary depending on the specific application and the nature and dimensions of the illumination target. Further, the present disclosure contemplates elimination as well as inclusion of additional optical elements into exemplary embodiments of the illumination systems constructed in accordance with the present disclosure, as would be known to those of ordinary skill in the art. For example, some embodiments of the present disclosure may include one or more of additional optical elements having optical power, fold mirrors, TIR prisms, PBS and polarizers.

Those of ordinary skill in the art will also readily recognize that the exemplary embodiments of the present disclosure can be used with a variety of configurations of the banks of light sources, including but not limited to the configurations shown in FIGS. 2A–6B. In addition, the exemplary embodiments of the present disclosure may be used with a variety of light sources. Such light sources include LEDs of other colors, organic light emitting diodes (OLED), vertical cavity surface emitting lasers (VCSEL) and other types of laser diodes, phosphorescent light sources and other suitable light emitting devices.

What is claimed is:

1. An illumination system comprising:
a plurality of illumination channels of different colors, each illumination channel comprising a bank of light sources having at least one optical element having optical power; and
an image-forming device disposed to receive illumination from at least one of the illumination channels;
wherein at least one of the optical elements of at least one of the illumination channels is not shared with other illumination channels and that optical element is preferentially constructed or preferentially positioned for the color of its illumination channel, such that said optical element decreases the performance of its illumination channel when said optical element is constructed or positioned as a corresponding element of another illumination channel; and
wherein at least one of the banks of light sources comprises a plurality of light sources incorporated into an assembly of reflectors and the assembly of reflectors is the at least one optical element that is preferentially constructed or preferentially positioned for the color of its illumination channel.

2. The illumination system as recited in claim 1, wherein the assembly of reflectors comprises a reflector body formed by a plurality of hollow or solid shaped reflector portions, each reflector portion conforming to a surface of revolution.

3. The illumination system as recited in claim 1, wherein the shape of the assembly of reflectors is preferentially constructed for the color of its illumination channel.

4. The illumination system as recited in claim 1, wherein the assembly of reflectors further comprises a coating that is preferentially constructed for the color of its illumination channel.

5. An illumination system comprising:
a plurality of illumination channels of different colors, each illumination channel comprising a bank of light sources having at least one optical element having optical power; and
an image-forming device disposed to receive illumination from at least one of the illumination channels;
wherein at least one of the optical elements of at least one of the illumination channels is not shared with other illumination channels and that optical element is preferentially constructed or preferentially positioned for the color of its illumination channel, such that said optical element decreases the performance of its illumination channel when said optical element is constructed or positioned as a corresponding element of another illumination channel;
wherein at least one bank of light sources comprises a plurality of light sources and a plurality of refractive optical elements and at least one of the refractive optical elements is the at least one optical element that is preferentially constructed or preferentially positioned for the color of its illumination channel; and wherein the shape of at least one of the refractive optical elements is preferentially constructed for the color of its illumination channel.

6. An illumination system comprising:

a plurality of illumination channels of different colors, each illumination channel comprising a bank of light sources having at least one optical element having optical power; and an image-forming device disposed to receive illumination from at least one of the illumination channels;

wherein at least one of the optical elements of at least one of the illumination channels is not shared with other illumination channels and that optical element is preferentially constructed or preferentially positioned for the color of its illumination channel, such that said optical element decreases the performance of its illumination channel when said optical element is constructed or positioned as a corresponding element of another illumination channel;

wherein at least one bank of light sources comprises a plurality of light sources and a plurality of refractive optical elements and at least one of the refractive optical elements is the at least one optical element that is preferentially constructed or preferentially positioned for the color of its illumination channel; and wherein at least one of the refractive optical elements further comprises a coating that is preferentially constructed for the color of its illumination channel.

7. An illumination system comprising:

a plurality of illumination channels of different colors, each illumination channel comprising a bank of light sources having at least one optical element having optical power; and an image-forming device disposed to receive illumination from at least one of the illumination channels;

wherein at least one of the optical elements of at least one of the illumination channels is not shared with other illumination channels and that optical element is preferentially constructed or preferentially positioned for the color of its illumination channel, such that said optical element decreases the performance of its illumination channel when said optical element is constructed or positioned as a corresponding element of another illumination channel;

wherein at least one bank of light sources comprises a plurality of light sources and a plurality of refractive optical elements and at least one of the refractive optical elements is the at least one optical element that is preferentially constructed or preferentially positioned for the color of its illumination channel; and wherein the plurality of light sources and the plurality of refractive optical elements are configured so that a different refractive optical element is associated with each light source.

8. An illumination system comprising:

a plurality of illumination channels of different colors, each illumination channel comprising a bank of light sources having at least one optical element having optical power; and an image-forming device disposed to receive illumination from at least one of the illumination channels;

wherein at least one of the optical elements of at least one of the illumination channels is not shared with other illumination channels and that optical element is preferentially constructed or preferentially positioned for the color of its illumination channel, such that said optical element decreases the performance of its illumination channel when said optical element is constructed or positioned as a corresponding element of another illumination channel;

wherein each illumination channel further comprises an integrator disposed between the bank of light sources of that channel and the image-forming device, each integrator having an entrance end optically connected to the bank of light sources and an exit end optically connected to the image-forming device; and wherein the entrance end of at least one integrator includes a subdivided aperture arrangement.

9. The illumination system as recited in claim 8, wherein the subdivided aperture arrangement comprises a plurality of reflective surfaces and the bank of light sources of that channel comprises a plurality of light source subassemblies, the reflective surfaces and subassemblies configured so that at least a portion of light from each of the light source subassemblies is received by one of the reflective surfaces and reflected into the integrator.

10. The illumination system as recited in claim 9, wherein the subdivided aperture arrangement further comprises at least one reflective coating disposed on at least one of the reflective surfaces and preferentially constructed for the color of its illumination channel.

11. The illumination system as recited in claim 9, wherein the subdivided aperture arrangement comprises a plurality of prisms, each prism having two facets and a diagonal, said prisms disposed proximate to the entrance end of the integrator, and wherein the diagonals of the prisms are the reflective surfaces receiving and reflecting into the integrator light from the light source subassemblies.

12. The illumination system as recited in claim 9, wherein the subdivided aperture arrangement further comprises at least one reflective coating disposed on at least one of the diagonals of the prisms and preferentially constructed for the color of its illumination channel.

13. The illumination system as recited in claim 9, wherein the subdivided aperture arrangement comprises a plurality of prisms, each prism having two facets and a diagonal side, said prisms disposed proximate to the entrance end of the integrator so that a portion of the entrance end remains clear thus forming an open portion, wherein the diagonals of the prisms are the reflective surfaces receiving and reflecting into the integrator light from the light source subassemblies, and wherein the bank of light sources from that illumination channel comprises a light source subassembly configured to illuminate the open portion.

14. The illumination system as recited in claim 13, wherein the subdivided aperture arrangement further comprises at least one color-specific coating disposed on at least one of the diagonals of the prisms or on the open portion.

15. An illumination system comprising:

a plurality of illumination channels of different colors, each illumination channel comprising a bank of light sources having at least one optical element having optical power; and an image-forming device disposed to receive illumination from at least one of the illumination channels;

wherein at least one of the optical elements of at least one of the illumination channels is not shared with other illumination channels and that optical element is preferentially constructed or preferentially positioned for the color of its illumination channel, such that said optical element decreases the performance of its illumination channel when said optical element is constructed or positioned as a corresponding element of another illumination channel;

wherein each illumination channel further comprises an integrator disposed between the bank of light sources of that channel and the image-forming device, each integrator having an entrance end optically connected to the bank of light sources and an exit end optically connected to the image-forming device; and wherein at least one of the integrators has a dimension that experiences a larger increase from the entrance end to the exit end, wherein the bank of light sources from the same illumination channel is configured to form a non-radially symmetrical aperture having a longer dimension and a shorter dimension, which produces illumination with a non-radially symmetrical angular intensity distribution having a larger angular dimension and a smaller angular dimension, and wherein the larger angular dimension of the angular intensity distribution at the entrance end of the integrator is substantially aligned with the dimension of that integrator that experiences the larger increase.

16. An illumination system comprising:

a plurality of illumination channels of different colors, each illumination channel comprising a bank of light sources having at least one optical element having optical power; and an image-forming device disposed to receive illumination from at least one of the illumination channels;

wherein at least one of the optical elements of at least one of the illumination channels is not shared with other illumination channels and that optical element is preferentially constructed or preferentially positioned for the color of its illumination channel, such that said optical element decreases the performance of its illumination channel when said optical element is constructed or positioned as a corresponding element of another illumination channel; and wherein at least one of the banks of light sources includes light sources of different shades of the color of that channel.

17. An illumination system comprising:

a plurality of illumination channels of different colors, each illumination channel comprising a bank of light sources having at least one optical element having optical power; and an image-forming device disposed to receive illumination from at least one of the illumination channels;

wherein at least one of the optical elements of at least one of the illumination channels is not shared with other illumination channels and that optical element is preferentially constructed or preferentially positioned for the color of its illumination channel, such that said optical element decreases the performance of its illumination channel when said optical element is constructed or positioned as a corresponding element of another illumination channel; and wherein at least one of the banks of light sources includes a plurality of light sources of a first shade, a plurality of light sources of a second shade and a dichroic combiner for combining light of the first and second shades.

18. The illumination system as recited in claim 17, wherein the light sources of the first shade emit light with a first peak wavelength and the light sources of the second shade emit light with a second peak wavelength, and wherein the first and second peak wavelengths are separated by no more than about 40 nm.

19. An illumination system comprising:

a plurality of illumination channels of different colors, each illumination channel comprising a bank of light sources having at least one optical element having optical power;

an image-forming device disposed to receive illumination from at least one of the illumination channels; and an integrator disposed between the banks of light sources and the image-forming device, the integrator having an entrance end optically connected to the banks of light sources and an exit end optically connected to the image-forming;

wherein at least one of the optical elements of at least one of the illumination channels is not shared with other illumination channels and that optical element is preferentially constructed or preferentially positioned for the color of its illumination channel, such that said optical element decreases the performance of its illumination channel when said optical element is constructed or positioned as a corresponding element of another illumination channel; and wherein the integrator has a dimension that experiences a larger increase from the entrance end to the exit end, wherein at least one bank of light sources is configured to form a non-radially symmetrical aperture having a longer dimension and a shorter dimension, and wherein the longer dimension of the aperture, the rotation axis of the dichroic mirrors and the dimension of the integrator experiencing the larger increase are substantially aligned.

20. An illumination system comprising:

a plurality of illumination channels of different colors, each illumination channel comprising a bank of light sources;

at least one optical element selected from the group consisting of an optical element having optical power and a homogenizing optical element, disposed in one of the illumination channels, said optical element not shared with other illumination channels and preferentially constructed or preferentially positioned for the color of its illumination channel, such that said optical element decreases the performance of its illumination channel when said optical element is constructed or positioned as a corresponding element of another illumination channel; and an image-forming device disposed to receive illumination from at least one of the illumination channels;

wherein the preferentially constructed or preferentially positioned optical element has a shape that is preferentially constructed for the color of its illumination channel.

21. An illumination system comprising:

a plurality of illumination channels of different colors, each illumination channel comprising a bank of light sources;

at least one optical element selected from the group consisting of an optical element having optical power and a homogenizing optical element, disposed in one of the illumination channels, said optical element not shared with other illumination channels and preferentially constructed or preferentially positioned for the color of its illumination channel, such that said optical element decreases the performance of its illumination channel when said optical element is constructed or positioned as a corresponding element of another illumination channel; and an image-forming device disposed to receive illumination from at least one of the illumination channels;

wherein the preferentially constructed or preferentially positioned optical element comprises a color-specific coating.

22. An illumination system comprising:

a plurality of illumination channels of different colors, each illumination channel comprising a bank of light sources;

at least one optical element selected from the group consisting of an optical element having optical power and a homogenizing optical element, disposed in one of the illumination channels, said optical element not shared with other illumination channels and preferentially constructed or preferentially positioned for the color of its illumination channel, such that said optical element decreases the performance of its illumination channel when said optical element is constructed or positioned as a corresponding element of another illumination channel; and an image-forming device disposed to receive illumination from at least one of the illumination channels;

wherein the preferentially constructed or preferentially positioned optical element is an integrator disposed between the bank of light sources of that channel and the image-forming device, the integrator having an entrance end optically connected to the bank of light sources and an exit end optically connected to the image-forming device; and wherein the entrance end of the integrator includes a subdivided aperture arrangement.

23. The illumination system as recited in claim 22, wherein the subdivided aperture arrangement comprises a plurality of reflective surfaces and the bank of light sources of that channel comprises a plurality of light source subassemblies, the reflective surfaces and the subassemblies configured so that at least a portion of light from each of the light source subassemblies is received by one of the reflective surfaces and reflected into the integrator.

24. The illumination system as recited in claim 23, wherein the subdivided aperture arrangement further comprises at least one reflective coating disposed on at least one of the reflective surfaces and preferentially constructed for the color of its illumination channel.

25. The illumination system as recited in claim 23, wherein the subdivided aperture arrangement comprises a plurality of prisms, each prism having two facets and a diagonal, said prisms disposed proximate to the entrance end of the integrator, and wherein the diagonals of the prisms are the reflective surfaces receiving and reflecting into the integrator light from the light source subassemblies.

26. The illumination system as recited in claim 25, wherein the subdivided aperture arrangement farther comprises at least one reflective coating disposed on at least one of the diagonals of the prisms and preferentially constructed for the color of its illumination channel.

27. The illumination system as recited in claim 23, wherein the subdivided aperture arrangement comprises a plurality of prisms, each prism having two facets and a diagonal side, said prisms disposed proximate to the entrance end of the integrator so that a portion of the entrance end remains clear thus forming an open portion, wherein the diagonals of the prisms are the reflective surfaces receiving and reflecting into the integrator light from the light source subassemblies, and wherein the bank of light sources from that illumination channel comprises a light source subassembly configured to illuminate the open portion.

28. The illumination system as recited in claim 27, wherein the subdivided aperture arrangement further comprises at least one color-specific coating disposed on at least one of the diagonals of the prisms or on the open portion.

29. An illumination system comprising:

a plurality of illumination channels of different colors, each illumination channel comprising a bank of light sources;

at least one optical element selected from the group consisting of an optical element having optical power and a homogenizing optical element, disposed in one of the illumination channels, said optical element not shared with other illumination channels and preferentially constructed or preferentially positioned for the color of its illumination channel, such that said optical element decreases the performance of its illumination channel when said optical element is constructed or positioned as a corresponding element of another illumination channel; and an image-forming device disposed to receive illumination from at least one of the illumination channels;

wherein the preferentially constructed or preferentially positioned optical element is an integrator disposed between the bank of light sources of that channel and the image-forming device, the integrator having an entrance end optically connected to the bank of light sources and an exit end optically connected to the image-forming device; and wherein the integrator has a dimension that experiences a larger increase from the entrance end to The exit end, wherein the bank of light sources from the same illumination channel is configured to form a non-radially symmetrical aperture having a longer dimension and a shorter dimension, which produces illumination with a non-radially symmetrical angular intensity distribution having a larger angular dimension arid a smaller angular dimension, and so that the larger angular dimension of the angular intensity distribution is substantially aligned with the dimension of the integrator that experiences the larger increase.

30. An illumination system comprising:

a plurality of illumination channels of different colors, each illumination channel comprising a bank of light sources;

at least one optical element selected from the group consisting of an optical element having optical power and a homogenizing optical element, disposed in one of the illumination channels, said optical element not shared with other illumination channels and preferentially constructed or preferentially positioned for the color of its illumination channel, such that said optical element decreases the performance of its illumination channel when said optical element is constructed or positioned as a corresponding element of another illumination channel; and an image-forming device disposed to receive illumination from at least one of the illumination channels;

wherein at least one of the banks of light sources includes light sources of different shades of the color of that channel.

31. An illumination system comprising:

a plurality of illumination channels of different colors, each illumination channel comprising a bank of light sources;

at least one optical element selected from the group consisting of an optical element having optical power and a homogenizing optical element, disposed in one of the illumination channels, said optical element not shared with other illumination channels and preferentially constructed or preferentially positioned for the color of its illumination channel, such that said optical element decreases the performance of its illumination channel when said optical element is constructed or positioned as a corresponding element of another illumination channel; and an image-forming device disposed to receive illumination from at least one of the illumination channels;

wherein at least one of the banks of light sources includes a plurality of light sources of a first shade, a plurality of light sources of a second shade and a dichroic combiner for combining light of the first and second shades.

32. The illumination system as recited in claim 31, wherein the light sources of the first shade emit light with a first peak wavelength and the light sources of the second shade emit light with a second peak wavelength, and wherein the first and second peak wavelengths are separated by no more than about 40 nm.

33. An illumination system, comprising:
a first color illumination channel comprising a first bank of light sources optically connected to a first image-forming device;
a second color illumination channel comprising a second bank of light sources optically connected to a second image-forming device; and
an optical element selected from the group consisting of: an optical element having optical power and a homogenizing optical element, disposed in one of the illumination channels and not shared with any other illumination channel, said optical element preferentially constructed or preferentially positioned for the color of its illumination channel, such that said optical element decreases the performance of its illumination channel when said optical element is constructed or positioned as a corresponding element of another illumination channel;
wherein at least one of the banks of light sources comprises a plurality of light sources incorporated into an assembly of reflectors; and
wherein the assembly of reflectors is the optical element preferentially constructed or preferentially positioned for the color of its illumination channel.

34. An illumination system, comprising:
a first color illumination channel comprising a first bank of light sources optically connected to a first image-forming device;
a second color illumination channel comprising a second bank of light sources optically connected to a second image-forming device; and
an optical element selected from the group consisting of: an optical element having optical power and a homogenizing optical element, disposed in one of the illumination channels and not shared with any other illumination channel, said optical element preferentially constructed or preferentially positioned for the color of its illumination channel, such that said optical element decreases the performance of its illumination channel when said optical element is constructed or positioned as a corresponding element of another illumination channel;
wherein the preferentially constructed or preferentially positioned optical element has a shape that is preferentially constructed for the color of its illumination channel.

35. An illumination system, comprising:
a first color illumination channel comprising a first bank of light sources optically connected to a first image-forming device;
a second color illumination channel comprising a second bank of light Sources optically connected to a second image-forming device; and
an optical element selected from the group consisting of: an optical element having optical power and a homogenizing optical element, disposed in one of the illumination channels and not shared with any other illumination channel, said optical element preferentially constructed or preferentially positioned for the color of its illumination channel, such that said optical element decreases the performance of its illumination channel when said optical element is constructed or positioned as a corresponding element of another illumination channel;
wherein the preferentially constructed or preferentially positioned optical element comprises a color-specific coating.

36. An illumination system, comprising:
a first color illumination channel comprising a first bank of light sources optically connected to a first image-forming device;
a second color illumination channel comprising a second bank of light sources optically connected to a second image-forming device; and
an optical element selected from the group consisting of an optical element having optical power and a homogenizing optical element, disposed in one of the illumination channels and not shared with any other illumination channel, said optical element preferentially constructed or preferentially positioned for the color of its illumination channel, such that said optical element decreases the performance of its illumination channel when said optical element is constructed or positioned as a corresponding element of another illumination channel;
wherein at least one of the banks of light sources includes light sources of different shades of the color of that channel.

37. An illumination system, comprising:
a first color illumination channel comprising a first bank of light sources optically connected to a first image-forming device;
a second color illumination channel comprising a second bank of light Sources optically connected to a second image-forming device; and
an optical element selected from the group consisting of: an optical element having optical power and a homogenizing optical element, disposed in one of the illumination channels and not shared with any other illumination channel, said optical element preferentially constructed or preferentially positioned for the color of its illumination channel, such that said optical element decreases the performance of its illumination channel when said optical element is constructed or positioned as a corresponding element of another illumination channel;
wherein at least one of the banks of light sources includes a plurality of light sources of a first shade, a plurality of light sources of a second shade and a dichroic combiner for combining light of the first and second shades.

38. The illumination system as recited in claim 37, wherein the light sources of the first shade emit light with a first peak wavelength and the light sources of the second shade emit light with a second peak wavelength, and wherein the first and second peak wavelengths are separated by no more than about 40 nm.

39. An illumination system, comprising:
a first color illumination channel comprising a first bank of light sources optically connected to a first image-forming device;
a second color illumination channel comprising a second bank of light sources optically connected to a second image-forming device; and
an optical element selected from the group consisting of: an optical element having optical power and a homogenizing optical element, disposed in one of the illumination channels and not shared with any other illumination channel, said optical element preferentially constructed or preferentially positioned for the color of its illumination channel, such that said optical element decreases the performance of its illumination channel when said optical element is constructed or positioned as a corresponding element of another illumination channel;
wherein the first illumination channel further comprises a first integrator disposed between the first bank of light sources and the first image-forming device, the first integrator having an entrance end optically connected to the first bank of light sources and an exit end optically connected to the first image-forming device, and wherein the second illumination channel further comprises a second integrator disposed between the second bank of light sources and the second image-forming device, the second integrator having an entrance end optically connected to the second bank of light sources and an exit end optically connected to the second image-forming device; and
wherein the entrance end of at least one of the first and second integrators includes a subdivided aperture arrangement.

40. An illumination system, comprising:
a first color illumination channel comprising a first bank of light sources optically connected to a first image-forming device;
a second color illumination channel comprising a second bank of light sources optically connected to a second image-forming device; and
an optical element selected from the group consisting of: an optical element having optical power and a homogenizing optical element, disposed in one of the illumination channels and not shared with any other illumination channel, said optical element preferentially constructed or preferentially positioned for the color of its illumination channel, such that said optical element decreases the performance of its illumination channel when said optical element is constructed or positioned as a corresponding element of another illumination channel;
wherein the first illumination channel further comprises a first integrator disposed between the first bank of light sources and the first image-forming device, the first integrator having an entrance end optically connected to the first bank of light sources and an exit end optically connected to the first image-forming device, and wherein the second illumination channel further comprises a second integrator disposed between the second bank of light sources and the second image-forming device, the second integrator having an entrance end optically connected to the second bank of light sources and an exit end optically connected to the second image-forming device; and
wherein at least one of the first and second integrators has a dimension experiencing a larger increase from the entrance end to the exit end, wherein the bank of light sources from the same channel is configured to form a non-radially symmetrical aperture having a long dimension and a short dimension, which produces illumination having non-radially symmetrical intensity distribution having a larger angular dimension and a smaller angular dimension, and so that the larger angular dimension of the illumination at the entrance end of the integrator is substantially aligned with the dimension of the integrator that experiences the larger increase.

41. An illumination system, comprising:
a first color illumination channel comprising a first bank of light sources optically connected to a first image-forming device;
a second color illumination channel comprising a second bank of light sources optically connected to a second image-forming device; and
an optical element selected from the group consisting of: an optical element having optical power and a homogenizing optical element, disposed in one of the illumination channels and not shared with any other illumination channel, said optical element preferentially constructed or preferentially positioned for the color of its illumination channel, such that said optical element decreases the performance of its illumination channel when said optical element is constructed or positioned as a corresponding element of another illumination channel;
wherein the first illumination channel further comprises a first integrator disposed between the first bank of light sources and the first image-forming device, the first integrator having an entrance end optically connected to the first bank of light sources and an exit end optically connected to the first image-forming device, and wherein the second illumination channel further comprises a second integrator disposed between the second bank of light sources and the second image-forming device, the second integrator having an entrance end optically connected to the second bank of light sources and an exit end optically connected to the second image-forming device;
wherein the first illumination channel further comprises a first relay optic disposed between the first integrator and the first image-forming device, and the second illumination channel further comprises a second relay optic disposed between the second integrator and the second image-forming device; and
wherein at least one of the first and second relay optic is preferentially constructed or preferentially positioned for the color of its illumination channel.

42. An illumination system, comprising:
a first color illumination channel comprising a first bank of light sources optically connected to a first image-forming device;
a second color illumination channel comprising a second bank of light sources optically connected to a second image-forming device; and an optical element selected from the group consisting of:
  an optical element having optical power and a homogenizing optical element, disposed in one of the illumination channels and not shared with any other illumination channel, said optical element preferentially constructed or preferentially positioned for the color of its illumination channel, such that said optical element decreases the performance of its illumination channel when said optical element is constructed or positioned as a corresponding element of another illumination channel;

wherein the first and second illumination channels further comprise a multi-directional optical element, disposed between the first bank of light sources and the first image-forming device and between the second bank of light sources and the second image-forming device, so that light from the first bank of light sources is refracted by the multi-directional optical element along a first direction and so that light from the second bank of light sources is refracted by the multi-directional optical element along a second direction.

43. The illumination system as recited in claim 42, wherein the first direction makes an angle of about 90 degrees with respect to the second direction.

44. The illumination system as recited in claim 42, wherein the multi-directional optical element is preferentially constructed or preferentially positioned along the first direction for the color of the first illumination channel.

45. The illumination system as recited in claim 44, wherein the multi-directional optical element is preferentially constructed or preferentially positioned along the second direction for the color of the second illumination channel.

46. An illumination system, comprising:
a first color illumination channel comprising a first bank of light sources optically connected to a first image-forming device;
a second color illumination channel comprising a second bank of light sources optically connected to a second image-forming device;
an optical element selected from the group consisting of:
  an optical element having optical power and a homogenizing optical element, disposed in one of the illumination channels and not shared with any other illumination channel, said optical element preferentially constructed or preferentially positioned for the color of its illumination channel, such that said optical element decreases the performance of its illumination channel when said optical element is constructed or positioned as a corresponding element of another illumination channel;
a third bank of light sources and a third image-forming device optically connected to the third bank of light sources;
a third integrator having an entrance end and an exit end, disposed so that the entrance end is optically connected to the third bank of light sources and the exit end is optically connected to the third image-forming device; and
a third relay optic disposed between the exit end of the third integrator and the third image-forming device;
wherein the third relay optic comprises a truncated refractive optical element.

* * * * *

UNITED STATES PATENT AND TRADEMARK OFFICE
CERTIFICATE OF CORRECTION

| | | |
|---|---|---|
| PATENT NO. | : 7,222,968 B2 | Page 1 of 1 |
| APPLICATION NO. | : 10/845677 | |
| DATED | : May 29, 2007 | |
| INVENTOR(S) | : Simon Magarill | |

It is certified that error appears in the above-identified patent and that said Letters Patent is hereby corrected as shown below:

Column 8,
Line 30, delete "2-4." and insert -- -- 2A-4. -- --, therefor.
Line 53, delete "2-4." and insert -- -- 2A-4. -- --, therefor.

Column 14,
Line 60, delete "2-3." And insert -- --2A-3. -- --, therefor.

Column 31,
Line 55, delete "farther" and insert -- -- further -- --, therefor.

Column 32,
Line 33, delete "The" and insert -- -- the -- --, therefor.
Line 40, delete "arid" and insert -- -- and -- --, therefor.

Signed and Sealed this

Second Day of October, 2007

JON W. DUDAS
*Director of the United States Patent and Trademark Office*